United States Patent
Sun et al.

(10) Patent No.: US 11,551,608 B2
(45) Date of Patent: Jan. 10, 2023

(54) DRIVER CIRCUIT, LIGHT-EMITTING PANEL AND PREPARATION METHOD THEREOF, AND DISPLAY DEVICE

(71) Applicant: Shanghai Tianma Microelectronics Co., Ltd., Shanghai (CN)

(72) Inventors: Xiaoping Sun, Shanghai (CN); Qiang Dong, Shanghai (CN); Lihua Wang, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 17/846,139

(22) Filed: Jun. 22, 2022

(65) Prior Publication Data

US 2022/0327994 A1 Oct. 13, 2022

(30) Foreign Application Priority Data

Mar. 3, 2022 (CN) .......................... 202210204637.7

(51) Int. Cl.
*G09G 3/32* (2016.01)
(52) U.S. Cl.
CPC ........... *G09G 3/32* (2013.01); *G09G 2330/04* (2013.01); *G09G 2330/08* (2013.01)
(58) Field of Classification Search
CPC ... G09G 3/32; G09G 2330/04; G09G 2330/08
See application file for complete search history.

(56) References Cited

U.S. PATENT DOCUMENTS

| 2017/0277315 A1* | 9/2017 | Wu | G06F 3/0443 |
| 2018/0197461 A1* | 7/2018 | Lai | G09G 3/2074 |
| 2020/0118494 A1* | 4/2020 | Park | G09G 3/3258 |
| 2021/0407381 A1* | 12/2021 | Park | G09G 3/3233 |

FOREIGN PATENT DOCUMENTS

| CN | 102982770 A | 3/2013 |
| CN | 111179848 A | 5/2020 |
| CN | 112669765 A | 4/2021 |

* cited by examiner

*Primary Examiner* — Andrew Sasinowski
(74) *Attorney, Agent, or Firm* — KDB Firm PLLC

(57) ABSTRACT

Provided are a driver circuit, a light-emitting panel and a preparation method thereof, and a display device. The driver circuit includes a terminal connection module, a drive module, and a short-circuit protection module. The terminal connection module, the drive module, and the short-circuit protection module are connected in series between a first power supply terminal and a second power supply terminal, and the short-circuit protection module is connected in series between the terminal connection module and the second power supply terminal. The terminal connection module is connected to an original light-emitting unit so that the original light-emitting unit is connected in series between the first power supply terminal and the second power supply terminal. The short-circuit protection module is configured to be disconnected in a case where the original light-emitting unit is short-circuited.

20 Claims, 16 Drawing Sheets

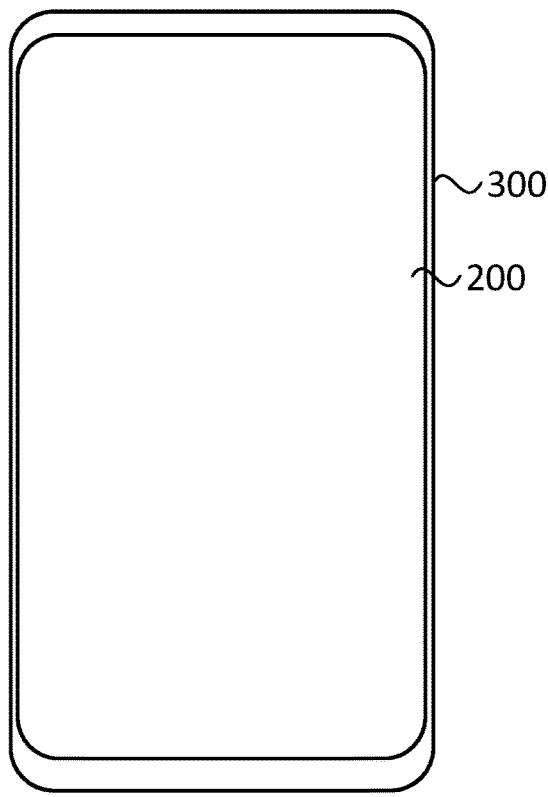

FIG. 33

| Prepare a driver circuit on a substrate, where the driver circuit includes a terminal connection module, a drive module, and a short-circuit protection module, where the terminal connection module, the drive module, and the short-circuit protection module are connected in series between a first power supply terminal and a second power supply terminal, and the short-circuit protection module is connected in series between the terminal connection module and the second power supply terminal | S110 |

↓

| Provide a light-emitting module, where the light-emitting module includes an original light-emitting unit | S120 |

↓

| Connect the original light-emitting unit to the connection end module so that the original light-emitting unit is connected in series between the first power supply terminal and the second power supply terminal, where the short circuit protection module is configured such that the original light-emitting unit is short-circuited, and the short circuit protection module is disconnected | S130 |

FIG. 34

DRIVER CIRCUIT, LIGHT-EMITTING PANEL AND PREPARATION METHOD THEREOF, AND DISPLAY DEVICE

CROSS-REFERENCE TO RELATED APPLICATION(S)

This application claims priority to Chinese Patent Application No. 202210204637.7 filed Mar. 3, 2022, the disclosure of which is incorporated herein by reference in its entirety.

TECHNICAL FIELD

The present disclosure relates to the field of display technologies and, in particular, to a driver circuit, a light-emitting panel and a preparation method thereof, and a display device.

BACKGROUND

With the continuous development of light-emitting technology and display technology, various display devices for displaying information are being developed. These display devices include liquid crystal display devices, organic light-emitting display devices, light-emitting diode display devices, and the like.

Generally, a driver circuit is provided for driving a light-emitting module in a display device to perform light-emitting display, and the light-emitting module often has faults such as a short-circuit. After the short-circuit occurs, the continuous high current damages elements in the driver circuit so that a display effect is affected.

SUMMARY

The present disclosure provides a driver circuit, a light-emitting panel and a preparation method thereof, and a display device, so as to avoid damage to elements in the driver circuit after a light-emitting module is short-circuited.

According to an aspect of the present disclosure, a driver circuit is provided for driving a light-emitting module to emit light.

The driver circuit includes a terminal connection module, a drive module, and a short-circuit protection module, where the terminal connection module, the drive module, and the short-circuit protection module are connected in series between a first power supply terminal and a second power supply terminal, and the short-circuit protection module is connected in series between the terminal connection module and the second power supply terminal.

The light-emitting module includes an original light-emitting unit, and the terminal connection module is connected to the original light-emitting unit so that the original light-emitting unit is connected in series between the first power supply terminal and the second power supply terminal.

The short-circuit protection module is configured to be disconnected in a case where the original light-emitting unit is short-circuited.

According to another aspect of the present disclosure, a light-emitting panel is provided and includes a light-emitting module and the driver circuit in the first aspect.

According to another aspect of the present disclosure, a display device is provided and includes the light-emitting panel described in the second aspect.

According to another aspect of the present disclosure, a preparation method of a light-emitting panel is provided and includes steps described below.

A driver circuit is prepared on a substrate, where the driver circuit includes a terminal connection module, a drive module, and a short-circuit protection module, where the terminal connection module, the drive module, and the short-circuit protection module are connected in series between a first power supply terminal and a second power supply terminal, and the short-circuit protection module is connected in series between the terminal connection module and the second power supply terminal.

A light-emitting module is provided, where the light-emitting module includes an original light-emitting unit.

The original light-emitting unit is connected to the terminal connection module so that the original light-emitting unit is connected in series between the first power supply terminal and the second power supply terminal.

The short-circuit protection module is configured to be disconnected in a case where the original light-emitting unit is short-circuited.

BRIEF DESCRIPTION OF DRAWINGS

To illustrate technical solutions in embodiments of the present disclosure more clearly, drawings used in description of the embodiments will be briefly described below. Apparently, the drawings described below merely illustrate part of the embodiments of the present disclosure, and those of ordinary skill in the art may obtain other drawings based on the drawings on the premise that no creative work is done.

FIG. 33 is a structural diagram of another display device according to an embodiment of the present disclosure;

FIG. 34 is a flowchart of a preparation method of a light-emitting panel according to an embodiment of the present disclosure;

DETAILED DESCRIPTION

The technical solutions in the embodiments of the present disclosure will be described clearly and completely in conjunction with the drawings in the embodiments of the present disclosure from which the solutions of the present disclosure will be better understood by those skilled in the art. Apparently, the embodiments described below are part, not all, of the embodiments of the present disclosure. Based on the embodiments of the present disclosure, all other embodiments obtained by those of ordinary skill in the art on the premise that no creative work is done are within the scope of the present disclosure.

It is to be noted that terms "first", "second" and the like in the description, claims and drawings of the present disclosure are used for distinguishing between similar objects and are not necessarily used for describing a particular order or sequence. It is to be understood that the data used in this way is interchangeable where appropriate so that the embodiments of the present disclosure described herein may also be implemented in a sequence not illustrated or described herein. In addition, terms "comprising", "including" and any other variations thereof are intended to encompass a non-exclusive inclusion. For example, a process, method, system, product or device that includes a series of steps or units not only includes the expressly listed steps or units but may also include other steps or units that are not expressly listed or are inherent to such process, method, product or device.

Figure 1:
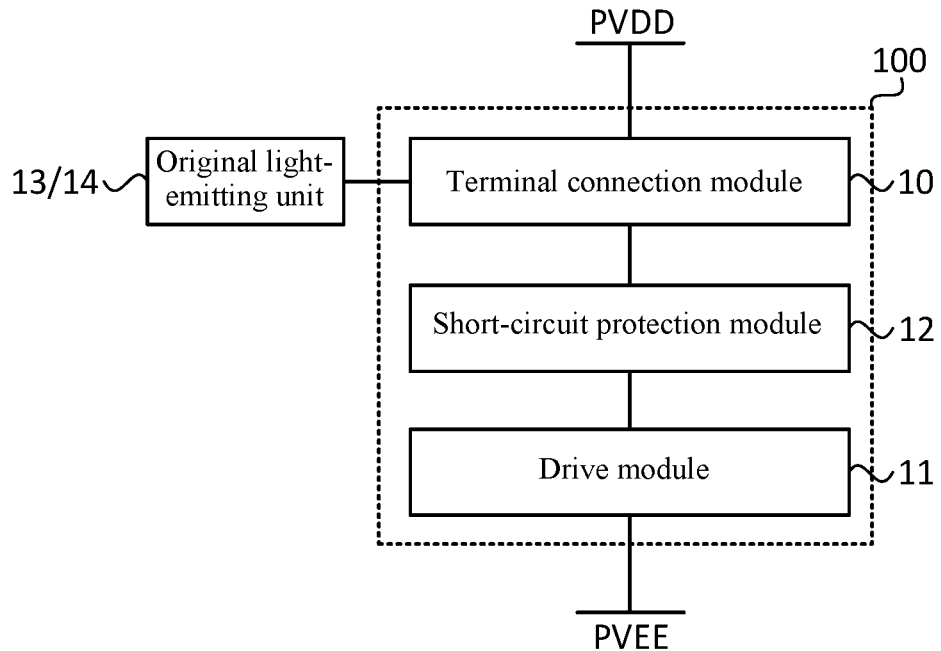
FIG. 1 is a structural diagram of a driver circuit according to an embodiment of the present disclosure.

FIG. 1 is a structural diagram of a driver circuit according to an embodiment of the present disclosure. As shown in FIG. 1, a driver circuit 100 provided in an embodiment of the present disclosure is configured to drive a light-emitting module 13 to emit light. The driver circuit 100 includes a terminal connection module 10, a drive module 11, and a short-circuit protection module 12. The terminal connection module 10, the drive module 11, and the short-circuit protection module 12 are connected in series between a first power supply terminal PVDD and a second power supply terminal PVEE, and the short-circuit protection module 12 is connected in series between the terminal connection module 10 and the second power supply terminal PVEE. The light-emitting module 13 includes an original light-emitting unit 14, and the terminal connection module 10 is connected to the original light-emitting unit 14 so that the original light-emitting unit 14 is connected in series between the first power supply terminal PVDD and the second power supply terminal PVEE. The short-circuit protection module 12 is configured to be disconnected in a case where the original light-emitting unit 14 is short-circuited.

In an embodiment, the terminal connection module 10, the drive module 11, and the short-circuit protection module 12 are connected in series between the first power supply terminal PVDD and the second power supply terminal PVEE. The terminal connection module 10 is connected to the original light-emitting unit 14 so that the original light-emitting unit 14 is connected in series between the first power supply terminal PVDD and the second power supply terminal PVEE, that is, the original light-emitting unit 14, the drive module 11, and the short-circuit protection module 12 form a path.

The first power supply terminal PVDD and the second power supply terminal PVEE are both fixed voltage terminals, and a voltage value provided by the first power supply terminal PVDD may be greater than a voltage value provided by the second power supply terminal PVEE. For example, the first power supply terminal PVDD provides a positive voltage, and the second power supply terminal PVEE provides a negative voltage, which is not limited thereto.

The light-emitting module 13 refers to a device or unit module capable of generating a light source. When a current flows from an end of the light-emitting module 13 to the other end of the light-emitting module 13, the light-emitting module 13 emits light. The light-emitting module 13 includes the original light-emitting unit 14, and the terminal connection module 10 is connected to the original light-emitting unit 14 so that the original light-emitting unit 14 is connected in series between the first power supply terminal PVDD and the second power supply terminal PVEE. An end of the original light-emitting unit 14 is connected to the first power supply terminal PVDD through the terminal connection module 10, and the other end of the original light-emitting unit 14 is connected to the short-circuit protection module 12 through the terminal connection module 10 so that the original light-emitting unit 14 is connected in series between the first power supply terminal PVDD and the short-circuit protection module 12, and when a current flows from an end of the original light-emitting unit 14 to the other end of the original light-emitting unit 14, the original light-emitting unit 14 emits light.

Figure 2:
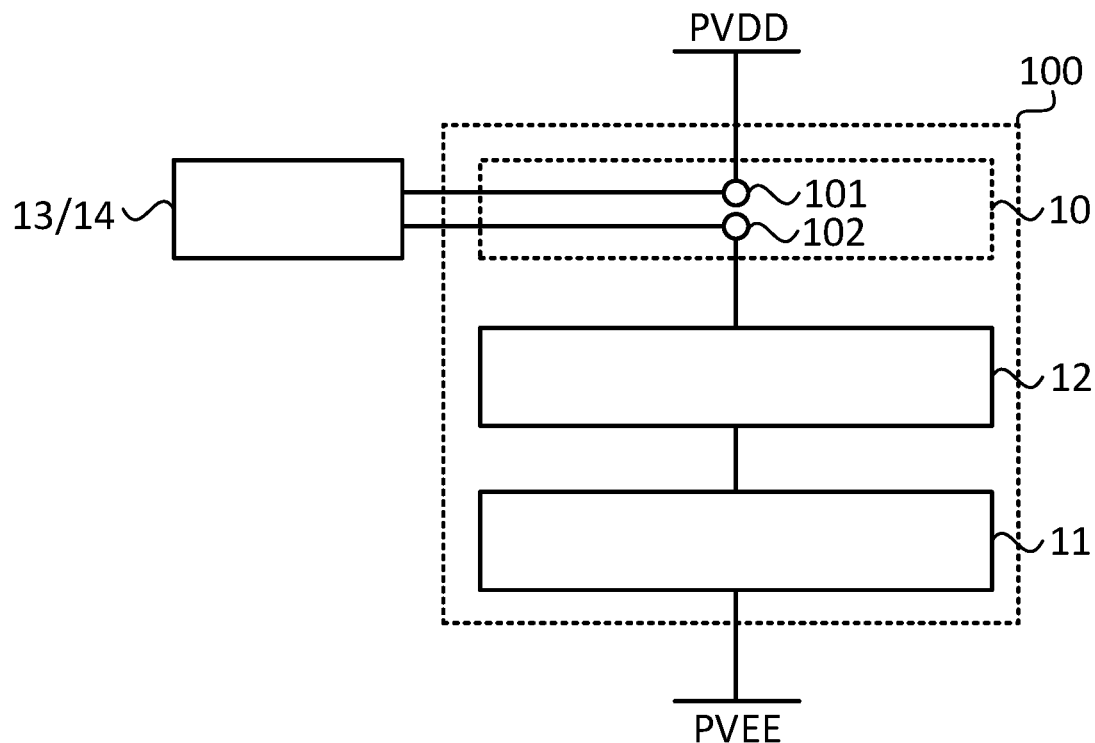
FIG. 2 is a structural diagram of another driver circuit according to an embodiment of the present disclosure.

A specific connection structure of the terminal connection module 10 may be set according to actual requirements. By way of example, FIG. 2 is a structural diagram of another driver circuit according to an embodiment of the present disclosure. As shown in FIG. 2, the terminal connection module 10 may include a first conductive terminal 101 and a second conductive terminal 102. The first conductive terminal 101 is electrically connected to the first power supply terminal PVDD, the second conductive terminal 102 is electrically connected to the short-circuit protection module 12, and the first conductive terminal 101 is insulated from the second conductive terminal 102. An end of the original light-emitting unit 14 is electrically connected to the first conductive terminal 101, and the other end of the original light-emitting unit 14 is connected to the second conductive terminal 102 so that the original light-emitting unit 14 is connected in series between the first power supply terminal PVDD and the short-circuit protection module 12, which is not limited thereto. The specific structure of the terminal connection module 10 is not limited in the embodiments of the present disclosure.

It is to be noted that positions of original light-emitting units 14 may be arranged and determined according to actual requirements, so as to achieve a better light-emitting effect. Generally, after a position of the terminal connection module 10 is determined, the original light-emitting unit 14 directly covers the terminal connection module 10 so as to achieve connection between the original light-emitting unit 14 and the terminal connection module 10, that is, the position of the original light-emitting unit 14 corresponds to the position of the terminal connection module 10, and the position of the original light-emitting unit 14 may be determined by the position of the terminal connection module 10.

The drive module 11 is configured to control a light emission state of the light-emitting module 10, so as to control light emission brightness of a region where the light-emitting module 10 is located, thereby achieving gray scale control.

The short-circuit protection module 12 is configured to be disconnected in a case where the original light-emitting unit 14 is short-circuited, so as to cut off a current path between the original light-emitting unit 14 and the second power supply terminal PVEE, thereby playing a role of short-circuit protection. In this manner, damage to elements in the driver circuit 100 caused by a continuous high current after the original light-emitting unit 14 is short-circuited and poor display caused by the damage are avoided.

At the same time, when the original light-emitting unit 14 is short-circuited, the short-circuit protection module 12 is disconnected, and the current path between the original light-emitting unit 14 and the second power supply terminal PVEE is cut off so that the original light-emitting unit 14 does not emit light, resulting in the appearance of a dark region. At this time, the human eye may easily find the short-circuited original light-emitting unit 14 and determine a position thereof, so as to achieve a function of short-circuit detection.

To sum up, in the driver circuit in the embodiments of the present disclosure, the short-circuit protection module 12 is connected in series between the original light-emitting unit 14 and the second power supply terminal PVEE, and in the case where the original light-emitting unit 14 is short-circuited, the short-circuit protection module 12 is disconnected, so as to cut off the current path between the original light-emitting unit 14 and the second power supply terminal PVEE. In this manner, damage to the elements in the driver circuit 100 caused by a continuous high current after the original light-emitting unit 14 is short-circuited and poor display caused by the damage are avoided.

Figure 3:
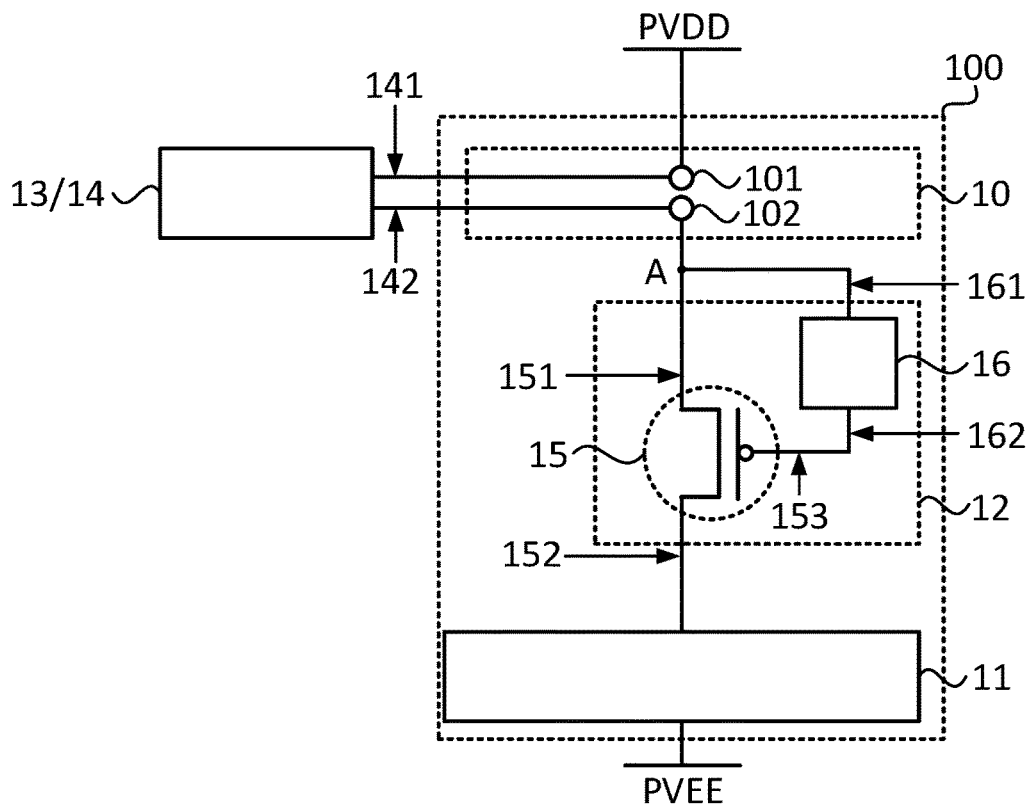
FIG. 3 is a structural diagram of another driver circuit according to an embodiment of the present disclosure.

FIG. 3 is a structural diagram of another driver circuit according to an embodiment of the present disclosure. As shown in FIG. 3, the short-circuit protection module 12 includes a first P-type transistor 15 and a first switching unit 16, and a power supply input terminal 141 of the original light-emitting unit 14 is connected to the first power supply terminal PVDD. A source 151 of the first P-type transistor 15, a first terminal 161 of the first switching unit 16, and a power supply output terminal 142 of the original light-emitting unit 14 are connected to a first node A. A drain 152 of the first P-type transistor 15 is connected to the second power supply terminal PVEE, and a gate 153 of the first P-type transistor 15 is connected to a second terminal 162 of the first switching unit 16. In the case where a voltage at the first node A is greater than a first threshold voltage, the first switching unit 16 is turned on, and the first P-type transistor 15 is turned off so that the short-circuit protection module 12 is disconnected.

As shown in FIG. 3, the short-circuit protection module 12 includes the first P-type transistor 15 and the first switching unit 16, and the power supply input terminal 141 of the original light-emitting unit 14 is connected to the first power supply terminal PVDD through the terminal connection module 10. The power supply output terminal 142 of the original light-emitting unit 14 is connected to the first node A through the terminal connection module 10. When the original light-emitting unit 14 operates normally, the voltage at the first node A is a difference $Vpvdd-V_{14}$ between a voltage Vpvdd at the first power supply terminal PVDD and a voltage drop $V_{14}$ of the original light-emitting unit 14. When the original light-emitting unit 14 is short-circuited, the voltage drop $V_{14}$ of the original light-emitting unit 14 decreases so that the voltage $Vpvdd-V_{14}$ at the first node A increases.

With continued reference to FIG. 3, the source 151 of the first P-type transistor 15 is connected to the first node A, the drain 152 of the first P-type transistor 15 is connected to the second power supply terminal PVEE, the first terminal 161 of the first switching unit 16 is connected to the first node A, and the second terminal 162 of the first switching unit 16 is connected to the gate 153 of the first P-type transistor 15. As described above, when the original light-emitting unit 14 is short-circuited, the voltage at the first node A increases, and when the voltage at the first node A increases to be greater than the first threshold voltage, the first switching unit 16 is turned on so that a voltage at the gate 153 of the first P-type transistor 15 increases, a difference Vg–Vs between a voltage Vg at the gate 153 of the first P-type transistor 15 and a voltage Vs at the source 151 of the first P-type transistor 15 is greater than a threshold voltage, the first P-type transistor 15 is turned off, and there is no conduction between the source 151 of the first P-type transistor 15 and the drain 152 of the first P-type transistor 15. In this case, the short-circuit protection module 12 is disconnected, so as to cut off the current path between the original light-emitting unit 14 and the second power supply terminal PVEE, thereby playing a role of short-circuit protection. In this manner, damage to the elements in the driver circuit 100 caused by a continuous high current after the original light-emitting unit 14 is short-circuited and poor display caused by the damage are avoided.

It is to be noted that when the original light-emitting unit 14 operates normally, that is, when the original light-emitting unit 14 is not short-circuited, the first switching unit 16 is in an off state, and an initial state of the first P-type transistor 15 is an on state. An on-resistance of the first P-type transistor 15 is very small and has little influence on power consumption so that a utilization rate of the power supply may be ensured.

Figure 4:
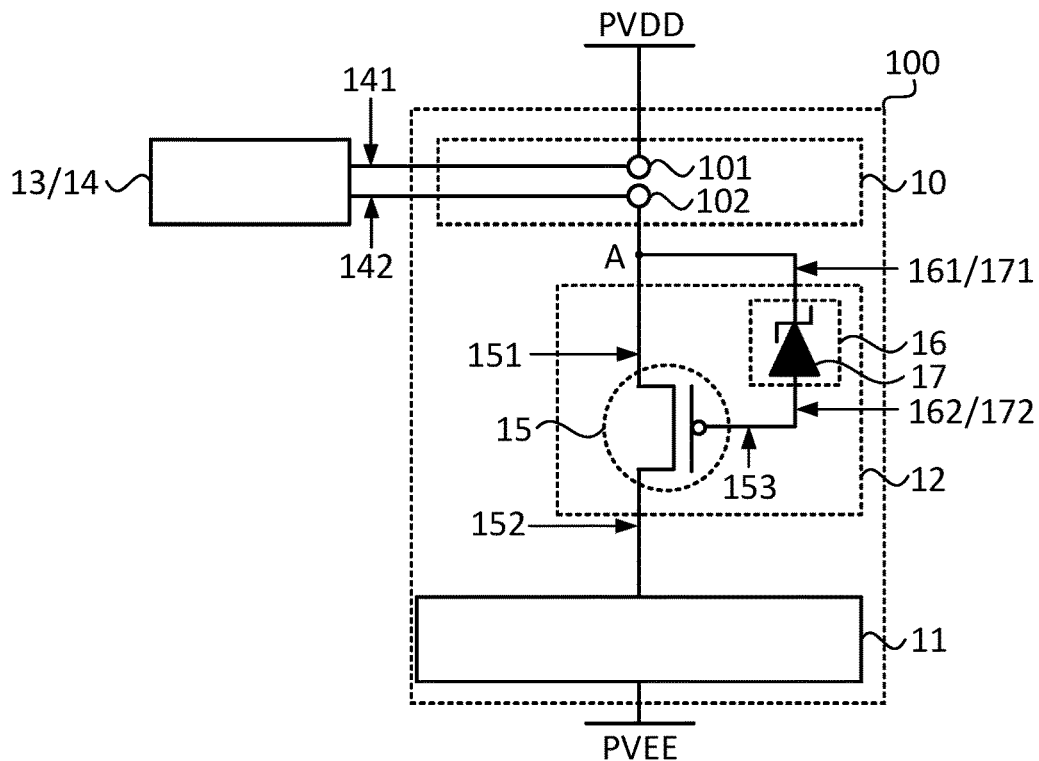
FIG. 4 is a structural diagram of another driver circuit according to an embodiment of the present disclosure.

FIG. 4 is a structural diagram of another driver circuit according to an embodiment of the present disclosure. As shown in FIG. 4, the first switching unit 16 includes a zener diode 17, where a cathode 171 of the zener diode 17 is used as the first terminal 161 of the first switching unit 16, and an anode 172 of the zener diode 17 is used as the second terminal 162 of the first switching unit 16.

Figure 5:
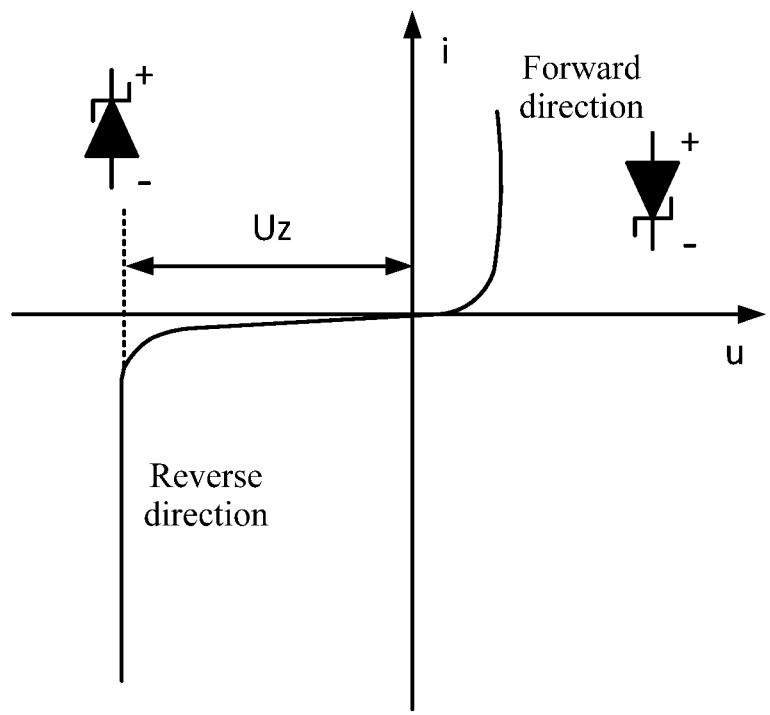
FIG. 5 is a schematic diagram of a volt-ampere characteristic curve of a zener diode according to an embodiment of the present disclosure.

FIG. 5 is a schematic diagram of a volt-ampere characteristic curve of a zener diode according to an embodiment of the present disclosure. As shown in FIG. 5, the zener diode 17 has a reverse conduction characteristic, and the reverse conduction characteristic is that in the case where a reverse voltage of the zener diode 17 is lower than a reverse breakdown voltage Uz of the zener diode 17, the zener diode 17 has a very large reverse resistance and an extremely small reverse leakage current. However, in the case where the reverse voltage is close to the reverse breakdown voltage Uz, the reverse current suddenly increases, which is called breakdown. At this time, the reverse resistance suddenly drops to a very small value.

With continued reference to FIG. 4, in this embodiment, the first switching unit 16 adopts the zener diode 17, and in this case, the reverse breakdown voltage of the zener diode 17 is used as the first threshold voltage. The cathode 171 of the zener diode 17 is used as the first terminal 161 of the first switching unit 16 and connected to the first node A, and the anode 172 of the zener diode 17 is used as the second terminal 162 of the first switching unit 16 and connected to the gate 153 of the first P-type transistor 15. When the original light-emitting unit 14 is short-circuited, the voltage at the first node A increases, and in the case where the voltage at the first node A increases to be greater than the reverse breakdown voltage of the zener diode 17, the zener diode 17 is broken down and turned on so that the voltage at the gate 153 of the first P-type transistor 15 increases, the first P-type transistor 15 is turned off, and there is no conduction between the source 151 of the first P-type transistor 15 and the drain 152 of the first P-type transistor 15. At this time, the short-circuit protection module 12 is disconnected, so as to cut off the current path between the original light-emitting unit 14 and the second power supply terminal PVEE. In this manner, damage to the elements in the driver circuit 100 caused by a continuous high current after the original light-emitting unit 14 is short-circuited and poor display caused by the damage are avoided.

Figure 6:
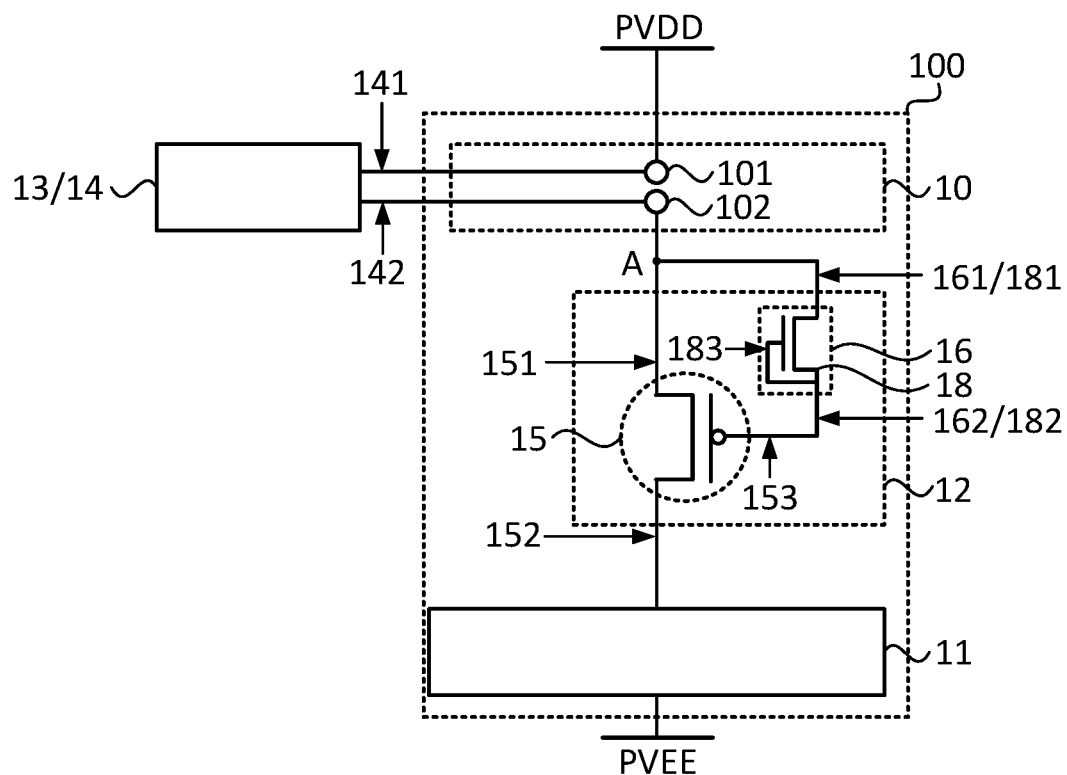
FIG. 6 is a structural diagram of another driver circuit according to an embodiment of the present disclosure.

FIG. 6 is a structural diagram of another driver circuit according to an embodiment of the present disclosure. As shown in FIG. 6, the first switching unit 16 includes a first N-type transistor 18, where a drain 181 of the first N-type transistor 18 is used as the first terminal 161 of the first switching unit 16, a source 182 of the first N-type transistor 18 is used as the second terminal 162 of the first switching unit 16, and a gate 183 of the first N-type transistor 18 is connected to the source 182 of the first N-type transistor 18.

Figure 7:
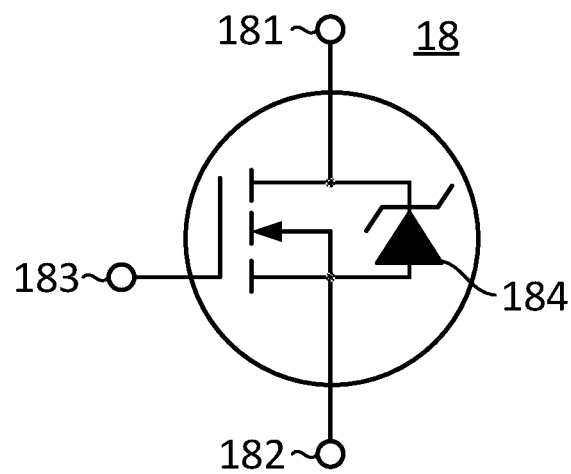
FIG. 7 is a structural diagram of a first N-type transistor according to an embodiment of the present disclosure.

FIG. 7 is a structural diagram of a first N-type transistor according to an embodiment of the present disclosure. As shown in FIG. 7, the first N-type transistor 18 includes a parasitic diode 184, where the parasitic diode 184 is connected between the drain 181 and the source 182 of the first N-type transistor and arranged from the source 182 to the drain 181. In the case where the gate 183 and the source 182 of the first N-type transistor 18 are connected, the first N-type transistor is equivalent to a diode. In the case where a reverse voltage of the parasitic diode 184 of the first N-type transistor is greater than a reverse breakdown voltage of the parasitic diode 184, the parasitic diode 184 is turned on reversely.

With continued reference to FIGS. 6 and 7, in this embodiment, the first switching unit 16 adopts the first N-type transistor 18, and in this case, the reverse breakdown voltage of the parasitic diode 184 in the first N-type transistor 18 is used as the first threshold voltage. The drain 181 of the first N-type transistor 18 is used as the first terminal 161 of the first switching unit 16 and connected to the first node A, the source 182 of the first N-type transistor 18 is used as the second terminal 162 of the first switching unit 16 and connected to the gate 153 of the first P-type transistor 15, and the gate 183 of the first N-type transistor 18 is connected to the source 182 of the first N-type transistor 18. When the original light-emitting unit 14 is short-circuited, the voltage at the first node A increases, and in the case where the voltage at the first node A increases to be greater than the reverse breakdown voltage of the parasitic diode 17 in the first N-type transistor 18, the parasitic diode 17 is broken down and turned on so that the voltage at the gate 153 of the first P-type transistor 15 increases, the first P-type transistor 15 is turned off, and at this time, there is no conduction between the source 151 of the first P-type transistor 15 and the drain 152 of the first P-type transistor 15. At this time, the short-circuit protection module 12 is disconnected, so as to cut off the current path between the original light-emitting unit 14 and the second power supply terminal PVEE. In this manner, damage to the elements in the driver circuit 100 caused by a continuous high current after the original light-emitting unit 14 is short-circuited and poor display caused by the damage are avoided.

It is to be noted that, in this embodiment, the first switching unit 16 adopts the first N-type transistor 18 so that the first N-type transistor 18 and the first P-type transistor 15 are prepared in a same process, thereby reducing preparation difficulty and shortening the process time.

Figure 8:
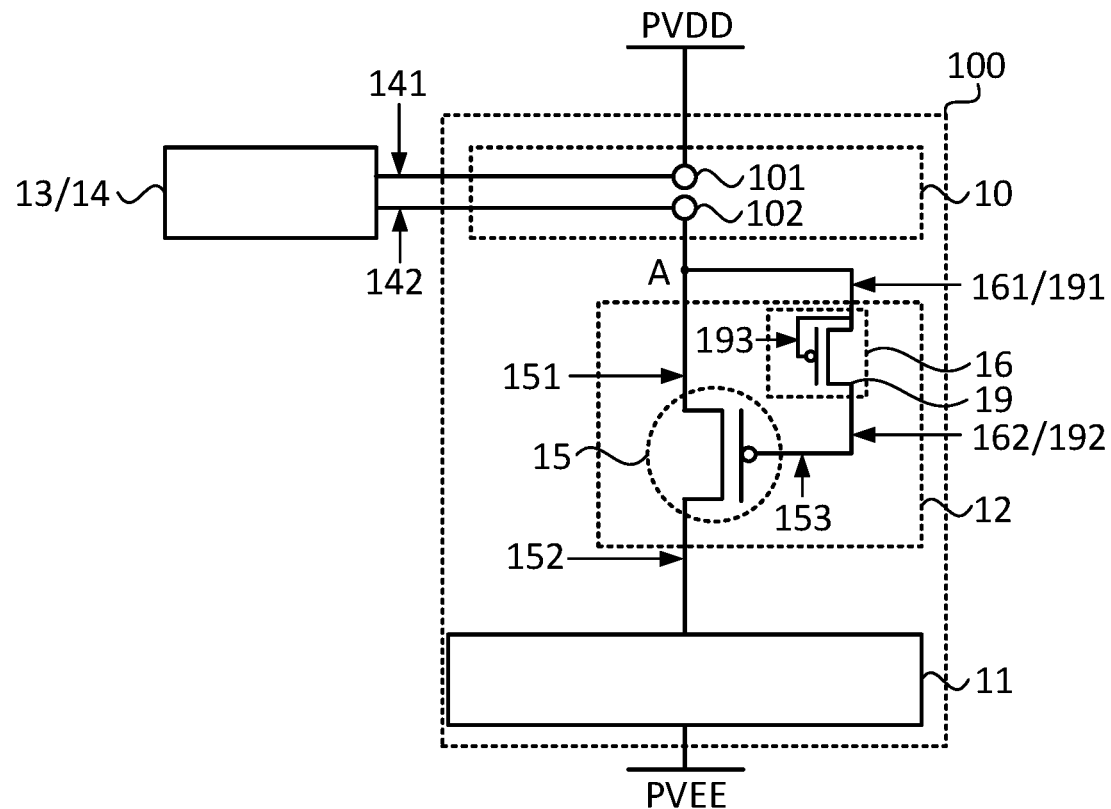
FIG. 8 is a structural diagram of another driver circuit according to an embodiment of the present disclosure.

FIG. 8 is a structural diagram of another driver circuit according to an embodiment of the present disclosure. In an embodiment, the first switching unit 16 includes a second P-type transistor 19, where a source 191 of the second P-type transistor 19 is used as the first terminal 161 of the first switching unit 16, a drain 192 of the second P-type transistor 19 is used as the second terminal 162 of the first switching unit 16, and a gate 193 of the second P-type transistor 19 is connected to the source 191 of the second P-type transistor 19.

Figure 9:
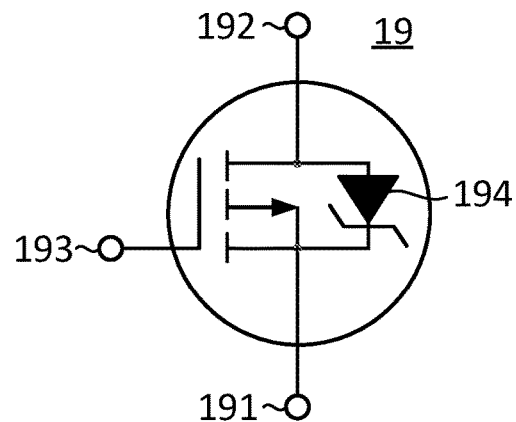
FIG. 9 is a structural diagram of a second P-type transistor according to an embodiment of the present disclosure.

FIG. 9 is a structural diagram of a second P-type transistor according to an embodiment of the present disclosure. As shown in FIG. 9, the second P-type transistor 19 includes a parasitic diode 194, where the parasitic diode 194 is connected between the source 191 and the drain 192 of the second P-type transistor 19 and arranged from the drain 192 to the source 191. In the case where the gate 193 and the source 191 of the second P-type transistor 19 are connected, the second P-type transistor 19 is equivalent to a diode. In the case where a reverse voltage of the parasitic diode 194 of the second P-type transistor 19 is greater than a reverse breakdown voltage of the parasitic diode 194, the parasitic diode 194 is turned on reversely.

With continued reference to FIGS. 8 and 9, in this embodiment, the first switching unit 16 adopts the second P-type transistor 19, and in this case, the reverse breakdown voltage of the parasitic diode 194 in the second P-type transistor 19 is used as the first threshold voltage. The source 191 of the second P-type transistor 19 is used as the first terminal 161 of the first switching unit 16 and connected to the first node A, the drain 192 of the second P-type transistor 19 is used as the second terminal 162 of the first switching unit 16 and connected to the gate 153 of the first P-type transistor 15, and the gate 193 of the second P-type transistor 19 is connected to the source 191 of the second P-type transistor 19. When the original light-emitting unit 14 is short-circuited, the voltage at the first node A increases, and in the case where the voltage at the first node A increases to be greater than the reverse breakdown voltage of the parasitic diode 194 in the second P-type transistor 19, the parasitic diode 194 is broken down and turned on so that the voltage at the gate 153 of the first P-type transistor 15 increases, the first P-type transistor 15 is turned off, and at this time, there is no conduction between the source 151 of the first P-type transistor 15 and the drain 152 of the first P-type transistor 15. At this time, the short-circuit protection module 12 is disconnected, so as to cut off the current path between the original light-emitting unit 14 and the second power supply terminal PVEE. In this manner, damage to the elements in the driver circuit 100 caused by a continuous high current after the original light-emitting unit 14 is short-circuited and poor display caused by the damage are avoided.

It is to be noted that, in this embodiment, the first switching unit 16 adopts the second P-type transistor 19 so that the second P-type transistor 19 and the first P-type transistor 15 are prepared in a same process, thereby reducing preparation difficulty and shortening the process time.

With continued reference to FIGS. 3 to 9, the first threshold voltage is less than the voltage at the first power supply terminal PVDD, and in the case where the original light-emitting unit 14 is not short-circuited, the voltage at the first node A is less than the first threshold voltage.

As shown in FIGS. 3 to 9, in the case where the original light-emitting unit 14 is not short-circuited, the voltage at the first node A is the difference Vpvdd−V$_{14}$ between the voltage Vpvdd at the first power supply terminal PVDD and the voltage drop V$_{14}$ of the original light-emitting unit 14, and in the case where the original light-emitting unit 14 is not short-circuited, the voltage Vpvdd−V$_{14}$ at the first node A is less than the first threshold voltage so that it is ensured that the first switching unit 16 is not turned on. At this time, the voltage at the gate 153 of the first P-type transistor 15 does not increase, and there is conduction between the source 151 of the first P-type transistor 15 and the drain 152 of the first P-type transistor 15, thereby ensuring a normal operation of the original light-emitting unit 14.

Further, in the case where the original light-emitting unit 14 is short-circuited, the voltage drop V$_{14}$ of the original light-emitting unit 14 approaches 0, and the voltage Vpvdd−V$_{14}$ at the first node A approaches Vpvdd. The first threshold voltage is configured to be less than the voltage Vpvdd at the first power supply terminal PVDD so that it is ensured that in the case where the original light-emitting unit 14 is short-circuited, the voltage at the first node A may increase to be greater than the first threshold voltage, thereby ensuring the conduction of the first switching unit 16. In this manner, the voltage at the gate 153 of the first P-type transistor 15 increases so that it is ensured that the first P-type transistor 15 is turned off and the reliability of the short-circuit protection module 12 is improved.

Figure 10:
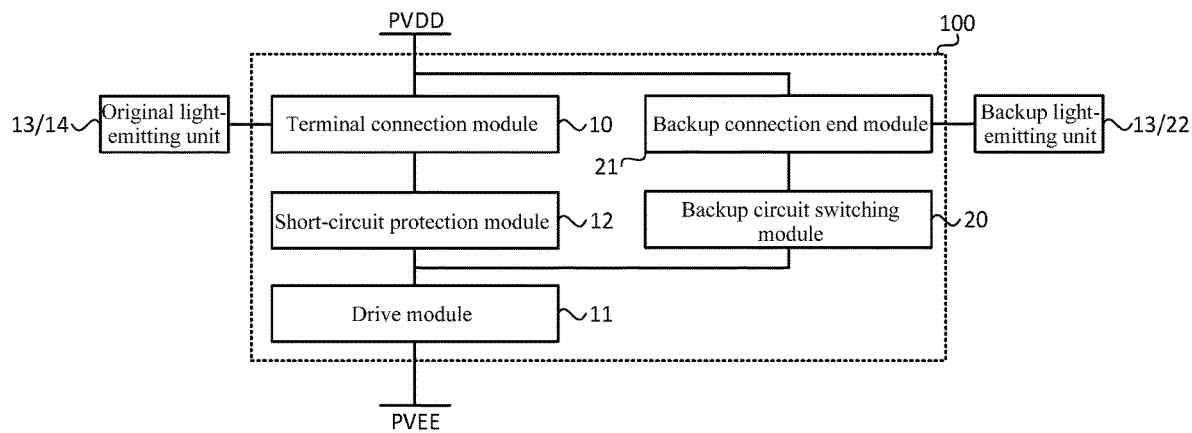
FIG. 10 is a structural diagram of another driver circuit according to an embodiment of the present disclosure.

FIG. 10 is a structural diagram of another driver circuit according to an embodiment of the present disclosure. As shown in FIG. 10, the driver circuit 100 provided in the embodiments of the present disclosure further includes a backup circuit switching module 20 and a backup terminal connection module 21, where the backup terminal connection module 21, the drive module 11, and the backup circuit switching module 20 are connected in series between the first power supply terminal PVDD and the second power supply terminal PVEE. The light-emitting module 13 further includes a backup light-emitting unit 22, and the backup terminal connection module 21 is connected to the backup light-emitting unit 22 so that the backup light-emitting unit 22 is connected in series between the first power supply terminal PVDD and the second power supply terminal PVEE. The backup circuit switching module 20 is configured to be turned on in a case where the original light-emitting unit 14 is short-circuited.

In an embodiment, the backup terminal connection module 21, the drive module 11, and the backup circuit switching module 20 are connected in series between the first power supply terminal PVDD and the second power supply terminal PVEE. The light-emitting module 13 includes the backup light-emitting unit 22, and the backup terminal connection module 20 is connected to the backup light-emitting unit 22 so that the backup light-emitting unit 22 is connected in series between the first power supply terminal PVDD and the second power supply terminal PVEE. An end of the backup light-emitting unit 22 is connected to the first power supply terminal PVDD through the backup terminal connection module 21, and the other end of the backup light-emitting unit 22 is connected to the backup circuit switching module 20 through the backup terminal connection module 21 so that the backup light-emitting unit 22 is connected in series between the first power supply terminal PVDD and the backup circuit switching module 20. At this time, the backup light-emitting unit 22, the drive module 11, and the backup circuit switching module 20 form a path. When a current flows from an end of the backup light-emitting unit 22 to the other end of the backup light-emitting unit 22, the backup light-emitting unit 22 emits light.

Figure 11:
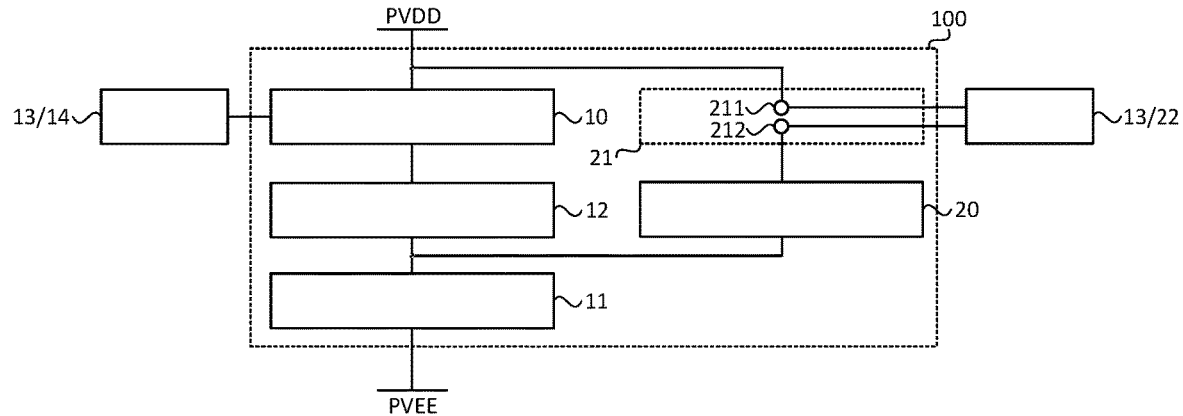
FIG. 11 is a structural diagram of another driver circuit according to an embodiment of the present disclosure.

A specific connection structure of the backup terminal connection module 21 may be set according to actual requirements. By way of example, FIG. 11 is a structural diagram of another driver circuit according to an embodiment of the present disclosure. As shown in FIG. 11, the backup terminal connection module 21 may include a third conductive terminal 211 and a fourth conductive terminal 212. The third conductive terminal 211 is electrically connected to the first power supply terminal PVDD, the fourth conductive terminal 212 is electrically connected to the backup circuit switching module 20, and the third conductive terminal 211 is insulated from the fourth conductive terminal 212. An end of the backup light-emitting unit 22 is electrically connected to the third conductive terminal 211, and the other end of the backup light-emitting unit 22 is connected to the fourth conductive terminal 212 so that the backup light-emitting unit 22 is connected in series between the first power supply terminal PVDD and the backup circuit switching module 20, which is not limited thereto. The specific structure of the backup terminal connection module 21 is not limited in the embodiments of the present disclosure.

It is to be noted that positions of backup light-emitting units 22 may be arranged and determined according to actual requirements, so as to achieve a better light-emitting effect. Generally, after a position of the backup terminal connection module 21 is determined, the backup light-emitting unit 22 directly covers the backup terminal connection module 21 so as to achieve connection between the backup light-emitting unit 22 and the backup terminal connection module 21, that is, the position of the backup light-emitting unit 22 corresponds to the position of the backup terminal connection module 21, and the position of the backup light-emitting unit 22 may be determined by the position of the backup terminal connection module 21.

The backup circuit switching module 20 is configured to be turned on in a case where the original light-emitting unit 14 is short-circuited so that the backup light-emitting unit 22 is turned on while the short-circuit protection module 12 cuts off the current path between the original light-emitting unit 14 and the second power supply terminal PVEE. In this case, the drive module 11 is configured to control a light emission state of the backup light-emitting unit 22 so that the backup light-emitting unit 22 replaces the short-circuited original light-emitting unit 14 to emit light, so as to ensure normal display.

It is to be understood that when the original light-emitting unit 14 is short-circuited, the short-circuit protection module 12 is disconnected, and the current path between the original light-emitting unit 14 and the second power supply terminal PVEE is cut off so that the original light-emitting unit 14 does not emit light, thereby forming a dark region. At this time, the backup circuit switching module 20 is turned on so as to turn on the backup light-emitting unit 22, and the backup light-emitting unit 22 emits light so as to restore the dark region. To enable the backup light-emitting unit 22 to better compensate the brightness of the dark region, the backup light-emitting unit 22 may be disposed adjacent to the original light-emitting unit 14 so as to achieve a better light-emitting effect.

Figure 12:
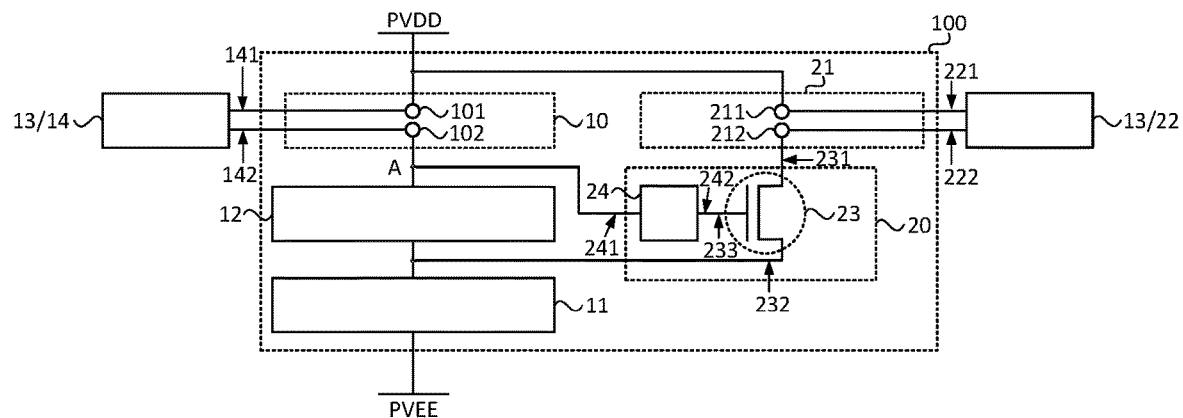
FIG. 12 is a structural diagram of another driver circuit according to an embodiment of the present disclosure.

FIG. 12 is a structural diagram of another driver circuit according to an embodiment of the present disclosure. As shown in FIG. 12, the backup circuit switching module 20 includes a second N-type transistor 23 and a second switching unit 24. A first terminal 241 of the second switching unit 24 and the power supply output terminal 142 of the original light-emitting unit 14 are connected to the first node A, a drain 231 of the second N-type transistor 23 is connected to the backup terminal connection module 21, a source 232 of the second N-type transistor 23 is connected to the second power supply terminal PVEE, and a gate 233 of the second N-type transistor 23 is connected to a second terminal 242 of the second switching unit 24. In the case where the voltage at the first node A is greater than the first threshold voltage, the second switching unit 24 is turned on, and the second N-type transistor 23 is turned on so that the backup circuit switching module 20 is turned on.

As shown in FIG. 12, the backup circuit switching module 20 includes the second N-type transistor 23 and the second switching unit 24, a power supply input terminal 221 of the backup light-emitting unit 22 is connected to the first power supply terminal PVDD through the backup terminal connection module 21, and a power supply output terminal 222 of the backup light-emitting unit 22 is connected to the drain 231 of the second N-type transistor 23 through the backup terminal connection module 21. The first terminal 241 of the second switching unit 24 and the power supply output terminal 142 of the original light-emitting unit 14 are connected to the first node A. When the original light-emitting unit 14 operates normally, the voltage at the first node A is a difference $Vpvdd-V_{14}$ between the voltage Vpvdd at the first power supply terminal PVDD and the voltage drop $V_{14}$ of the original light-emitting unit 14. When the original light-emitting unit 14 is short-circuited, the voltage drop $V_{14}$ of the original light-emitting unit 14 decreases so that the voltage $Vpvdd-V_{14}$ at the first node A increases.

With continued reference to FIG. 12, the source 232 of the second N-type transistor 23 is connected to the second power supply terminal PVEE, and the gate 233 of the second N-type transistor 23 is connected to the second terminal 242 of the second switching unit 24. As described above, when the original light-emitting unit 14 is short-circuited, the voltage at the first node A increases, and when the voltage at the first node A increases to be greater than the first threshold voltage, the second switching unit 24 is turned on so that a voltage at the gate 233 of the second N-type transistor 23 increases, a difference Vg–Vs between the voltage Vg at the gate 233 of the second N-type transistor 23 and a voltage Vs at the source 232 of the second N-type transistor 23 is greater than a threshold voltage, and the second N-type transistor 23 is turned on. At this time, there is conduction between the source 232 and the drain 231 of the second N-type transistor 23, that is, the backup circuit switching module 20 is turned on, thereby turning on the backup light-emitting unit 22. At this time, the drive module 11 controls the light emission state of the backup light-emitting unit 22 so that the backup light-emitting unit 22 replaces the short-circuited original light-emitting unit 14 to emit light, so as to restore the dark region, thereby ensuring the normal display.

Figure 13:
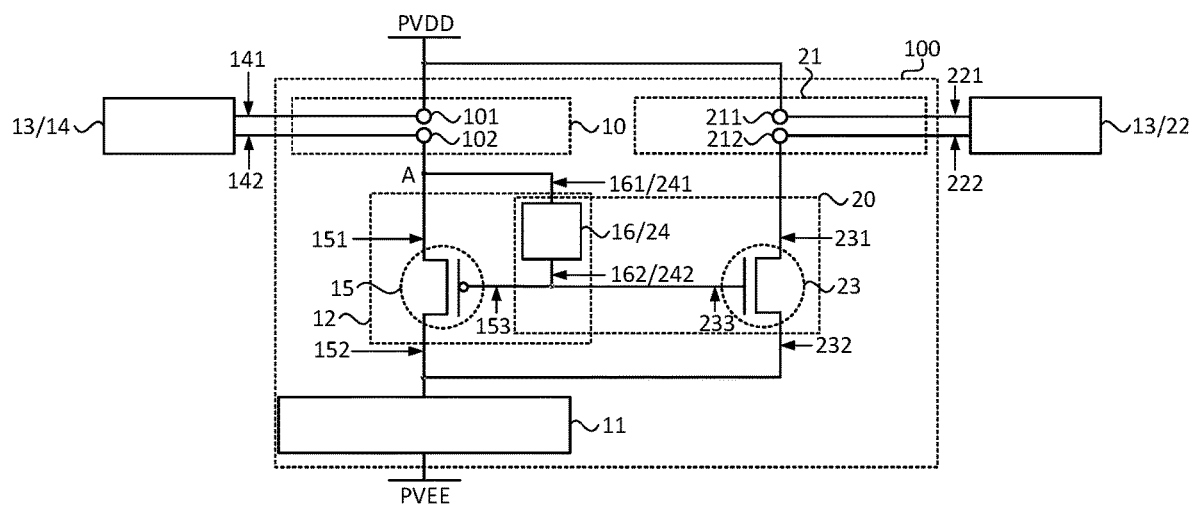
FIG. 13 is a structural diagram of another driver circuit according to an embodiment of the present disclosure.

FIG. 13 is a structural diagram of another driver circuit according to an embodiment of the present disclosure. As shown in FIG. 13, the short-circuit protection module 12 includes the first P-type transistor 15 and the first switching unit 16, and the power supply input terminal 141 of the original light-emitting unit 14 is connected to the first power supply terminal PVDD. The source 151 of the first P-type transistor 15, the first terminal 161 of the first switching unit 16, and the power supply output terminal 142 of the original light-emitting unit 14 are connected to the first node A. The drain 152 of the first P-type transistor 15 is connected to the second power supply terminal PVEE, and the gate 153 of the first P-type transistor 15 is connected to the second terminal 162 of the first switching unit 16, where the second switching unit 24 and the first switching unit 16 are the same switching unit.

In an embodiment, as shown in FIG. 13, the second switching unit 24 and the first switching unit 16 are the same switching unit. When the original light-emitting unit 14 is short-circuited, the voltage at the first node A increases, and when the voltage at the first node A increases to be greater than the first threshold voltage, the first switching unit 16 is turned on so that the voltage at the gate 153 of the first P-type transistor 15 and the voltage at the gate 233 of the second N-type transistor 23 increase, the first P-type transistor 15 is turned off, the short-circuit protection module 12 is disconnected, and the current path between the original light-emitting unit 14 and the second power supply terminal PVEE is cut off, thereby playing a role of short-circuit protection. At the same time, the voltage at the gate 233 of the second N-type transistor 23 increases, and the second N-type transistor 23 is turned on, that is, the backup circuit switching module 20 is turned on so that the backup light-emitting unit 22 is turned on. At this time, the drive module 11 controls the light emission state of the backup light-emitting unit 22 so that the backup light-emitting unit 22 replaces the short-circuited original light-emitting unit 14 to emit light, so as to restore the dark region, thereby ensuring the normal display.

The second switching unit 24 and the first switching unit 16 are configured to be the same switching unit so that the switching unit is reused, thereby greatly simplifying a circuit structure and reducing the cost.

Figure 14:
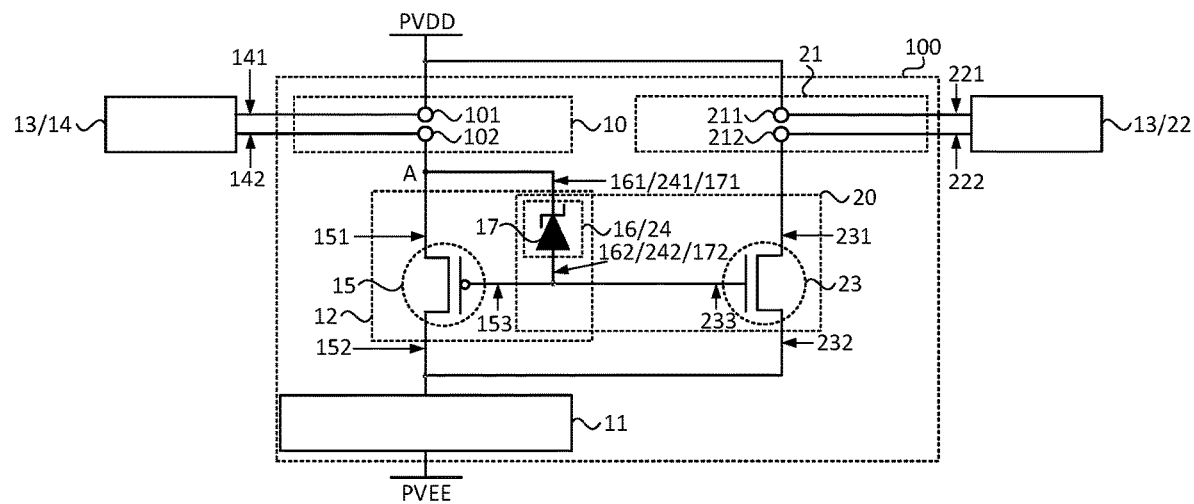
FIG. 14 is a structural diagram of another driver circuit according to an embodiment of the present disclosure.

FIG. 14 is a structural diagram of another driver circuit according to an embodiment of the present disclosure. As shown in FIG. 14, by way of example, the second switching unit 24 may include the zener diode 17, where the cathode 171 of the zener diode 17 is used as the first terminal 241 of the second switching unit 24, the anode 172 of the zener diode 17 is used as the second terminal 242 of the second switching unit 24, and the reverse breakdown voltage of the zener diode 17 is used as the first threshold voltage. For a specific operation process of the zener diode 17, reference may be made to the preceding embodiments, which is not repeated here.

Figure 15:
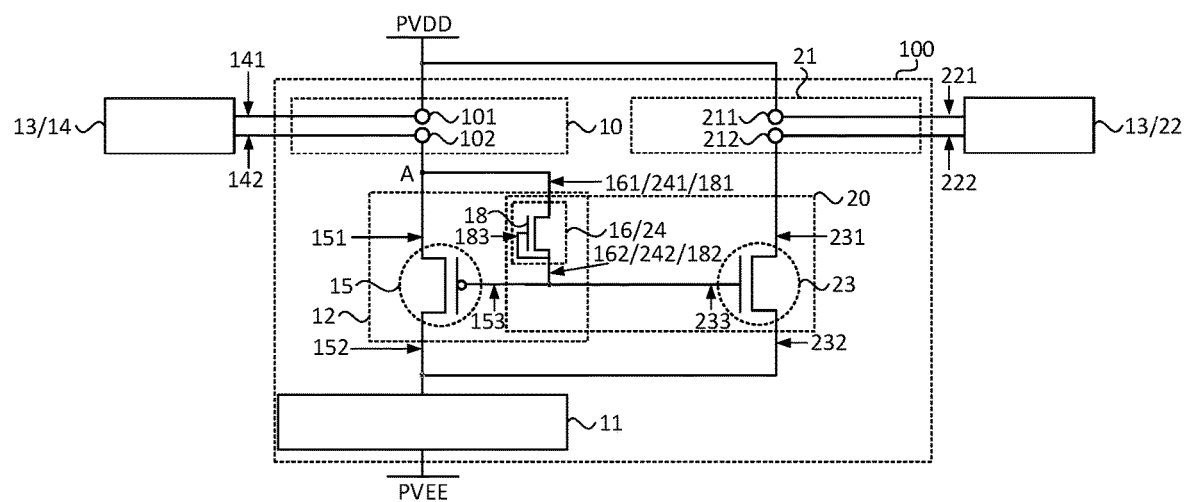
FIG. 15 is a structural diagram of another driver circuit according to an embodiment of the present disclosure.

FIG. 15 is a structural diagram of another driver circuit according to an embodiment of the present disclosure. As shown in FIG. 15, by way of example, the second switching unit 24 may also include the first N-type transistor 18, where the drain 181 of the first N-type transistor 18 is used as the first terminal 241 of the second switching unit 24, the source 182 of the first N-type transistor 18 is used as the second terminal 242 of the second switching unit 24, the gate 183 of the first N-type transistor 18 is connected to the source 182 of the first N-type transistor 18, and the reverse breakdown voltage of the parasitic diode in the first N-type transistor 18 is used as the first threshold voltage. For a specific operation process of the first N-type transistor 18, reference may be made to the preceding embodiments, which is not limited here.

Figure 16:
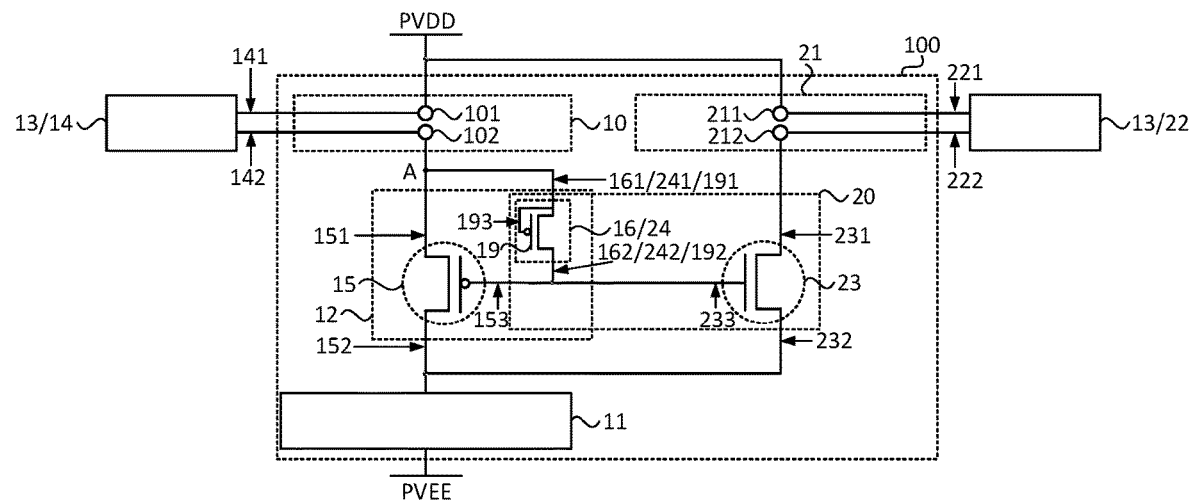
FIG. 16 is a structural diagram of another driver circuit according to an embodiment of the present disclosure.

FIG. 16 is a structural diagram of another driver circuit according to an embodiment of the present disclosure. As shown in FIG. 16, by way of example, the second switching unit 24 may also include the second P-type transistor 19, where the source 191 of the second P-type transistor 19 is used as the first terminal 241 of the second switching unit 24, the drain 192 of the second P-type transistor 19 is used as the second terminal 242 of the second switching unit 24, the gate 193 of the second P-type transistor 19 is connected to the source 191 of the second P-type transistor 19, and the reverse breakdown voltage of the parasitic diode in the second P-type transistor 19 is used as the first threshold voltage. For a specific operation process of the second P-type transistor 19, reference may be made to the preceding embodiments, which is not limited here.

With continued reference to FIGS. 12 to 16, a threshold voltage of the second N-type transistor 23 is less than the voltage at the first power supply terminal PVDD.

Referring to FIGS. 12 to 16, when the original light-emitting unit 14 is not short-circuited, the voltage at the first node A is the difference $V_{pvdd}-V_{14}$ between the voltage $V_{pvdd}$ at the first power supply terminal PVDD and the voltage drop $V_{14}$ of the original light-emitting unit 14. When the original light-emitting unit 14 is short-circuited, the voltage drop $V_{14}$ of the original light-emitting unit 14 approaches 0, the voltage $V_{pvdd}-V_{14}$ at the first node A approaches $V_{pvdd}$, and the second switching unit 24 is turned on so that the voltage at the gate 233 of the second N-type transistor 23 also approaches $V_{pvdd}$. The threshold voltage of the second N-type transistor 23 is configured to be less than the voltage at the first power supply terminal PVDD so that the second N-type transistor 23 is turned on, thereby improving the reliability of the backup circuit switching module 20.

It is to be noted that when the original light-emitting unit 14 is not short-circuited, the voltage $V_{pvdd}-V_{14}$ at the first node A is less than the first threshold voltage, and the second switching unit 24 is not turned on. At this time, the voltage at the gate 233 of the second N-type transistor 23 does not increase, and the second N-type transistor 23 is turned off, that is, the backup circuit switching module 20 is disconnected, thereby ensuring that the backup light-emitting unit 22 does not emit light and interfere with the normal display.

It is to be noted that FIGS. 13 to 16 only uses the case where the second switching unit 24 and the first switching unit 16 are the same switching unit as an example for description. In other embodiments, the second switching unit 24 and the first switching unit 16 are both independent switching power supplies so that a short-circuit protection part (the terminal connection module 10 and the short-circuit protection module 12) and a backup circuit opening part (the backup circuit switching module 20 and the backup terminal connection module 21) of the driver circuit 100 may be flexibly split and combined, thereby saving the corresponding material cost, which is not limited in the embodiments of the present disclosure.

Figure 17:
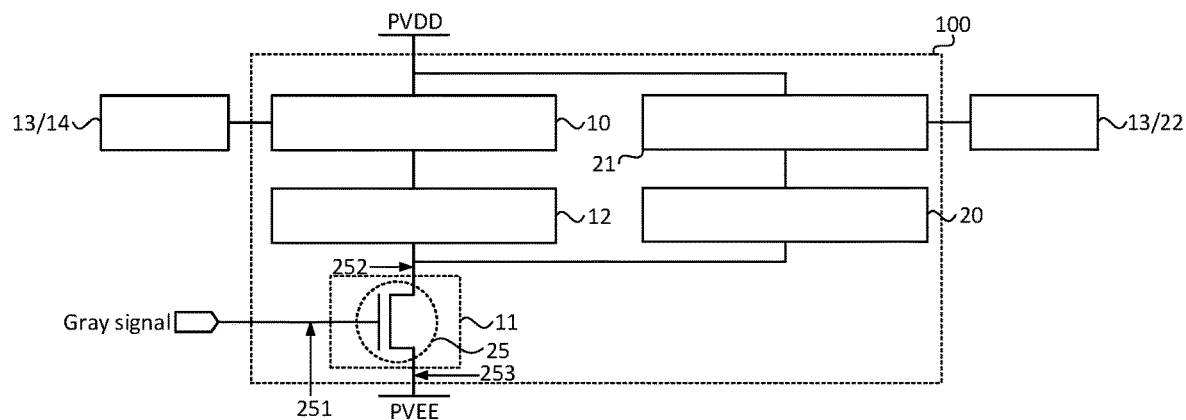
FIG. 17 is a structural diagram of another driver circuit according to an embodiment of the present disclosure.
Figure 18:
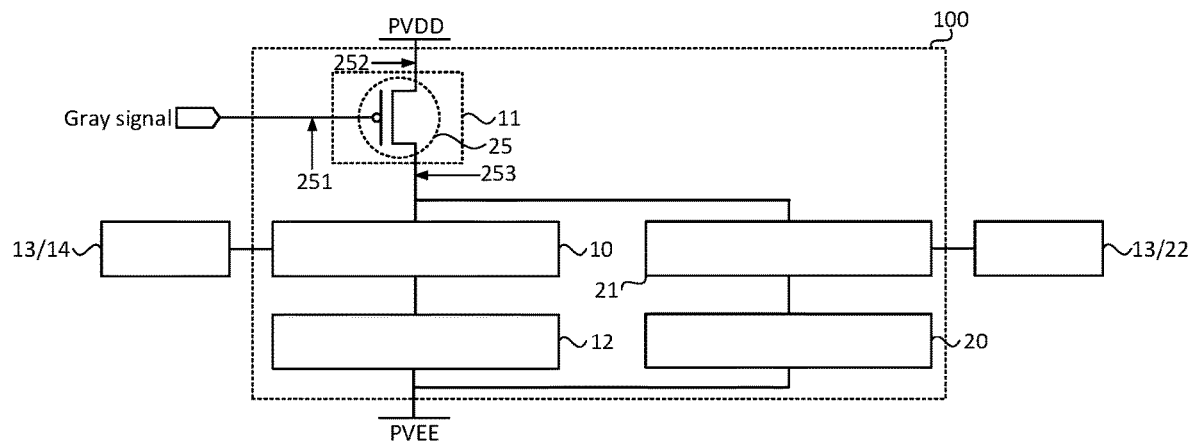
FIG. 18 is a structural diagram of another driver circuit according to an embodiment of the present disclosure.

FIG. 17 is a structural diagram of another driver circuit according to an embodiment of the present disclosure, and FIG. 18 is a structural diagram of another driver circuit according to an embodiment of the present disclosure. As shown in FIGS. 17 and 18, the drive module 11 includes a first transistor 25, where a control terminal 251 of the first transistor 25 is connected to a pulse width modulation (PWM) signal terminal Gray signal, a first terminal 252 of the first transistor 25 is electrically connected to the short-circuit protection module 12, and a second terminal 253 of the first transistor 25 is electrically connected to the second power supply terminal PVEE; or the first terminal 252 of the first transistor 25 is connected to the first power supply terminal PVDD, and the second terminal 253 of the first transistor 25 is connected to the terminal connection module 10.

As shown in FIGS. 17 and 18, the drive module 11 includes the first transistor 25. Generally, the first transistor 25 includes a gate, a source, and a drain, where the gate is used as the control terminal 251 of the first transistor 25 and electrically connected to the PWM signal terminal, and the drive module 11 may be controlled so as to control a light emission state of the light-emitting module 13. By way of example, a conduction state of the first transistor 25 in the drive module 11 may be controlled so as to control the light emission state of the light-emitting module 13, where the first transistor 25 in the drive module 11 is in an on state, and the light-emitting module 13 emits light; the first transistor 25 in the drive module 11 is in an off state, and the light-emitting module 13 does not emit light.

By way of example, the output of the PWM signal terminal may be a square wave signal. A duty cycle of the square wave signal may be adjusted so as to adjust light emission brightness of the light-emitting module 13.

The first transistor 25 may be an N-type transistor, and the first transistor 25 may also be a P-type transistor.

For example, as shown in FIG. 17, the case where the first transistor 25 is an N-type transistor is used as an example, a drain of the N-type transistor is used as the first terminal 252 of the first transistor 25 and electrically connected to the short-circuit protection module 12, a source of the N-type transistor is used as the second terminal 253 of the first transistor 25 and connected to the second power supply terminal PVEE, and a gate of the N-type transistor is used as the control terminal 251 of the first transistor 25 and connected to the PWM signal terminal Gray signal. In the case where the PWM signal terminal outputs a high level, the first transistor 25 is turned on.

For another example, as shown in FIG. 18, the case where the first transistor 25 is a P-type transistor is used as an example, a source of the P-type transistor is used as the first terminal 252 of the first transistor 25 and connected to the first power supply terminal PVDD, a drain of the P-type transistor is used as the second terminal 253 of the first transistor 25 and connected to the terminal connection module 10, and a gate of the P-type transistor is used as the control terminal 251 of the first transistor 25 and connected to the PWM signal terminal Gray signal. In the case where the PWM signal terminal outputs a low level, the first transistor 25 is turned on.

It is to be noted that FIGS. 17 and 18 only illustrate the application of the drive module 11 to the driver circuit 100 including the short-circuit protection module 12 and the backup circuit switching module 20. In fact, a specific structure of the drive module 11 provided in the embodiment of the present disclosure is applicable to any of the preceding embodiments, which is not repeated here.

In addition, the specific structure of the drive module 11 is not limited to the preceding embodiments. In other embodiments, the drive module 11 may further include more transistors and capacitors, which may be set by those skilled in the art according to actual requirements and not limited in the embodiments of the present disclosure.

Figure 19:
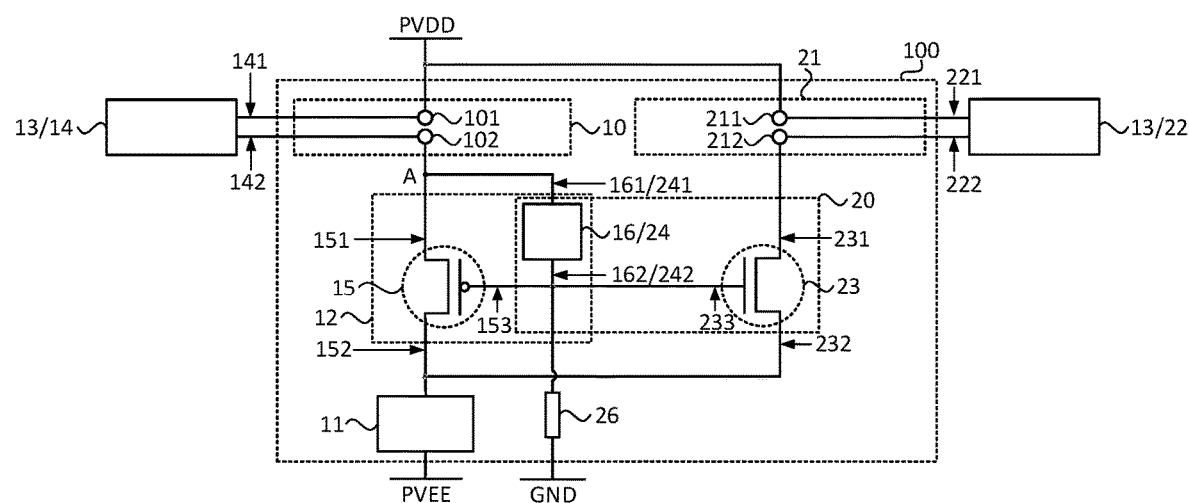
FIG. 19 is a structural diagram of another driver circuit according to an embodiment of the present disclosure.

FIG. 19 is a structural diagram of another driver circuit according to an embodiment of the present disclosure. As shown in FIG. 19, the driver circuit 100 further includes a pull-down resistor 26, where an end of the pull-down resistor 26 is connected to the gate 153 of the first P-type transistor 15, and the other end of the pull-down resistor 26 is grounded.

By way of example, as shown in FIG. 19, the pull-down resistor 26 is connected to the gate 153 of the first P-type transistor 15 so that in the case where the original light-emitting unit 14 is not short-circuited, a signal of the gate 153 of the first P-type transistor 15 is clamped at a lower level, so as to ensure that the first P-type transistor 15 is in an on state, thereby ensuring the normal lighting of the original light-emitting unit 14.

With continued reference to FIG. 19, in the case where the driver circuit 100 further includes the backup circuit switching module 20 and the backup terminal connection module 21 and the backup circuit switching module 20 includes the second N-type transistor 23 and the second switching unit 24, it is also feasible that an end of the pull-down resistor 26 is connected to the gate 233 of the second N-type transistor 23 and the other end of the pull-down resistor 26 is grounded so that in the case where the original light-emitting unit 14 is not short-circuited, a signal of the gate 233 of the second N-type transistor 23 is clamped at a lower level, so as to ensure that the second N-type transistor 23 is in an off state, thereby ensuring that the backup light-emitting unit 22 does not emit light and interfere with the normal display.

A resistance value of the pull-down resistor 26 may be set according to actual requirements. For example, the resistance value of the pull-down resistor 26 is set to 0 ohms or more. Further, the resistance value of the pull-down resistor 26 may be set to 10K ohms or more. A specific value may be set according to a voltage value at the first power supply terminal PVDD.

In this embodiment, the pull-down resistor 26 is provided, thereby playing a role of current limiting, so as to prevent the current in a loop formed by the first power supply terminal PVDD, the first switching unit 16 and/or the second switching unit 24 and the pull-down resistor 26 from being too large.

It is to be noted that FIG. 19 only illustrates the application of the drive module 11 to the driver circuit 100 including the short-circuit protection module 12 and the backup circuit switching module 20. In fact, the configuration of the pull-down resistor 26 provided in the embodiment of the present disclosure is applicable to any of the preceding embodiments, which is not repeated here.

Based on the same inventive concept, an embodiment of the present disclosure further provides a light-emitting panel. The light-emitting panel provided in the embodiment of the present disclosure includes a light-emitting module and any driver circuit provided in the preceding embodiments. Therefore, the light-emitting panel provided in the embodiment of the present disclosure has the technical effects of the technical solutions in any of the preceding embodiments and explanations of structures and terms the same as or corresponding to structures and terms in the preceding embodiments are not repeated here.

In an embodiment, the light-emitting panel provided in the embodiment of the present disclosure may be used as a display panel or a backlight module.

For example, the light-emitting panel may be used as the backlight module so as to achieve brightness sub-region control of the backlight module. In this manner, when the backlight module is applied to a display panel (such as a liquid crystal display panel), the backlight module may provide backlight for the sub-region of the display panel so that brightness adjustment in the sub-region is performed, a bright state picture may have higher brightness, and a dark state picture may approach zero brightness, so as to achieve higher image brightness contrast, which is conducive to improving image display quality and achieving the display of high-dynamic range (HDR) images.

In other embodiments, the light-emitting panel may also be used as the display panel, and the display panel is an active light-emitting display panel and may directly perform displaying with relatively low power consumption and cost.

Figure 20:
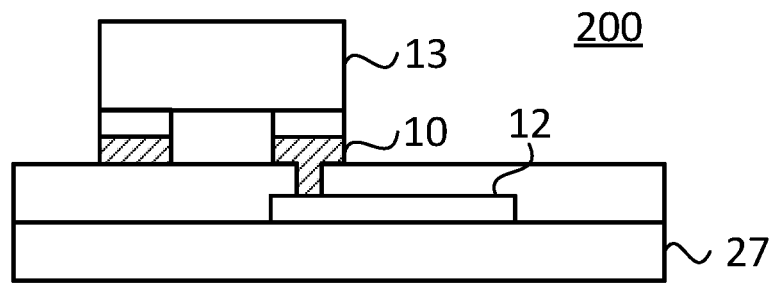
FIG. 20 is a partial sectional diagram of a light-emitting panel according to an embodiment of the present disclosure.
Figure 21:
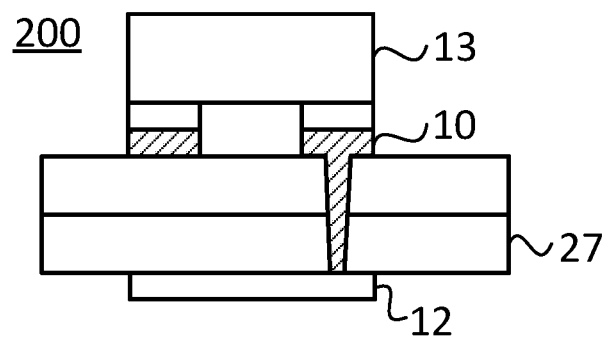
FIG. 21 is a partial sectional diagram of another light-emitting panel according to an embodiment of the present disclosure.

FIG. 20 is a partial sectional diagram of a light-emitting panel according to an embodiment of the present disclosure, and FIG. 21 is a partial sectional diagram of another light-emitting panel according to an embodiment of the present disclosure. As shown in FIGS. 20 and 21, a light-emitting panel 200 includes a substrate 27, the light-emitting module 13 is disposed on a side of the substrate 27, the terminal connection module 10 is located on a side of the substrate 27 facing towards the light-emitting module 13, and the short-circuit protection module 12 is located on the side of the substrate 27 facing towards the light-emitting module 13, or the short-circuit protection module 12 is located on a side of the substrate 27 facing away from the light-emitting module 13.

By way of example, as shown in FIG. 20, the short-circuit protection module 12 may be located on the side of the substrate 27 facing towards the light-emitting module 13. In this case, the short-circuit protection module 12 and the drive module 11 may be prepared in a same process, thereby reducing preparation difficulty and shortening the process time.

In other embodiments, as shown in FIG. 21, the short-circuit protection module 12 may also be located on the side of the substrate 27 facing away from the light-emitting module 13. In this case, holes are drilled in the substrate 27 so as to achieve connection between the light-emitting module 13 and the short-circuit protection module 12. The short-circuit protection module 12 is located on the side of the substrate 27 facing away from the light-emitting module 13 so that the device layout of the existing light-emitting panel 200 may not be changed, and the short-circuit protection module 12 may overlap with the existing device of the light-emitting panel 200 along a thickness direction of the light-emitting panel 200, thereby saving space.

Figure 22:
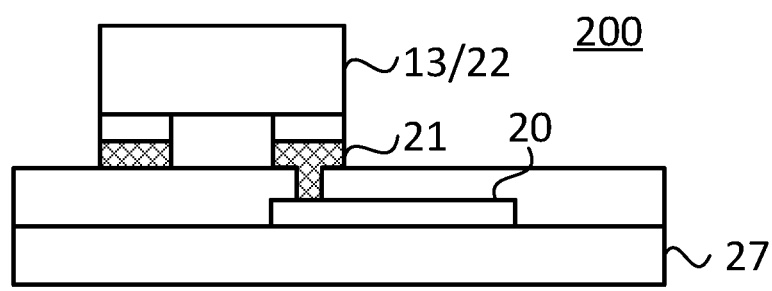
FIG. 22 is a partial sectional diagram of another light-emitting panel according to an embodiment of the present disclosure.
Figure 23:
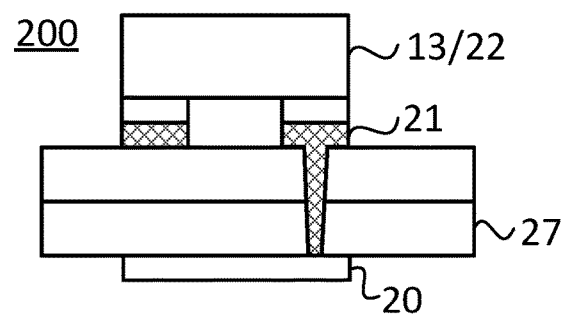
FIG. 23 is a partial sectional diagram of another light-emitting panel according to an embodiment of the present disclosure.

FIG. 22 is a partial sectional diagram of another light-emitting panel according to an embodiment of the present disclosure, and FIG. 23 is a partial sectional diagram of another light-emitting panel according to an embodiment of the present disclosure. As shown in FIGS. 10, 22 and 23, the driver circuit 100 further includes the backup circuit switching module 20 and the backup terminal connection module 21, where the backup terminal connection module 21, the drive module 11, and the backup circuit switching module 20 are connected in series between the first power supply terminal PVDD and the second power supply terminal PVEE. The light-emitting module 13 further includes the backup light-emitting unit 22, and the backup terminal connection module 21 is connected to the backup light-emitting unit 22 so that the backup light-emitting unit 22 is connected in series between the first power supply terminal PVDD and the second power supply terminal PVEE. The backup circuit switching module 20 is configured to be turned on in a case where the original light-emitting unit 14 is short-circuited. The light-emitting panel 200 includes the substrate 27, the light-emitting module 13 is disposed on a side of the substrate 27, the backup terminal connection module 21 is located on the side of the substrate 27 facing towards the light-emitting module 13, and the backup circuit switching module 20 is located on the side of the substrate 27 facing towards the light-emitting module 13, or the backup circuit switching module 20 is located on the side of the substrate 27 facing away from the light-emitting module 13.

The backup circuit switching module 20 and the backup terminal connection module 21 are provided, and the backup circuit switching module 20 is configured to be turned on in a case where the original light-emitting unit 14 is short-circuited so that the backup light-emitting unit 22 is turned on while the short-circuit protection module 12 cuts off the current path between the original light-emitting unit 14 and the second power supply terminal PVEE. In this case, the drive module 11 is configured to control the light emission state of the backup light-emitting unit 22 so that the backup light-emitting unit 22 replaces the short-circuited original light-emitting unit 14 to emit light, so as to ensure the normal display.

By way of example, as shown in FIG. 22, the short-circuit protection module 20 may be located on the side of the substrate 27 facing towards the light-emitting module 13. In this case, the backup circuit switching module 20 and the drive module 11 may be prepared in a same process, thereby reducing preparation difficulty and shortening the process time.

In other embodiments, as shown in FIG. 23, the backup circuit switching module 20 may also be located on the side of the substrate 27 facing away from the light-emitting module 13. In this case, holes are drilled in the substrate 27 so as to achieve connection between the light-emitting module 13 and the backup circuit switching module 20. The backup circuit switching module 20 is located on the side of the substrate 27 facing away from the light-emitting module 13 so that the device layout of the existing light-emitting panel 200 may not be changed, and the backup circuit switching module 20 may overlap with the existing device of the light-emitting panel 200 along a thickness direction of the light-emitting panel 200, thereby saving space.

Figure 24:
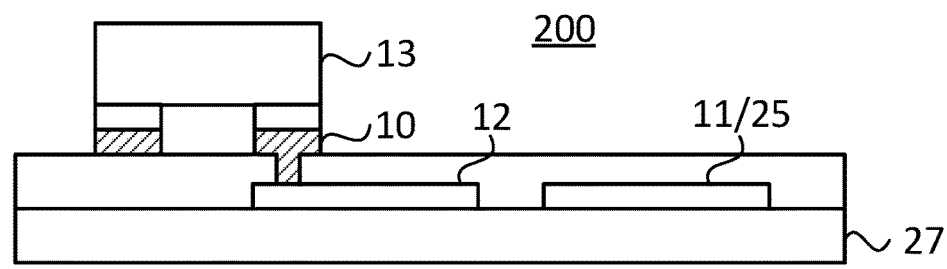
FIG. 24 is a partial sectional diagram of another light-emitting panel according to an embodiment of the present disclosure.
Figure 25:
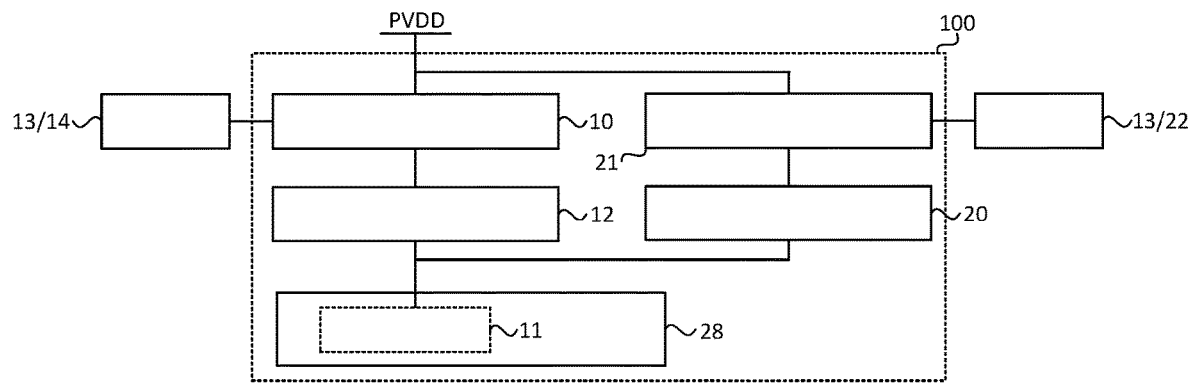
FIG. 25 is a partial structural diagram of a light-emitting panel according to an embodiment of the present disclosure.
Figure 26:
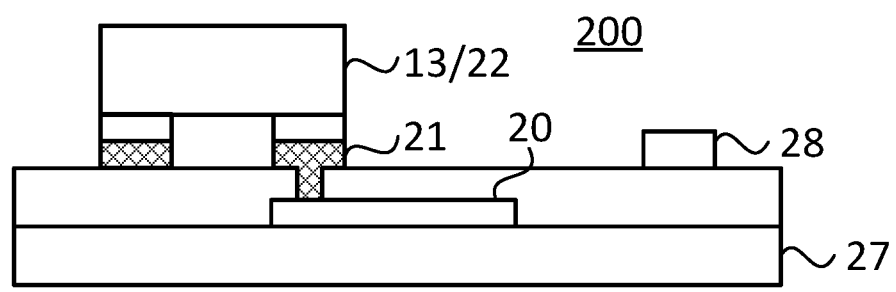
FIG. 26 is a partial sectional diagram of another light-emitting panel according to an embodiment of the present disclosure.

FIG. 24 is a partial sectional diagram of another light-emitting panel according to an embodiment of the present disclosure, FIG. 25 is a partial structural diagram of a light-emitting panel according to an embodiment of the present disclosure, and FIG. 26 is a partial sectional diagram of another light-emitting panel according to an embodiment of the present disclosure. As shown in FIG. 17 and FIGS. 24 to 26, the light-emitting panel 200 includes the substrate 27, the drive module 11 includes the first transistor 25, the control terminal 251 of the first transistor 25 is connected to the PWM signal terminal Gray signal, and the first transistor 25 is located on a side of the substrate 27; alternatively, the light-emitting panel 200 further includes a driver chip 28, and the drive module 11 is integrated in the driver chip 28.

By way of example, as shown in FIGS. 17 and 24, the drive module 11 includes the first transistor 25. Generally, the first transistor 25 includes a gate, a source, and a drain, where the gate is used as the control terminal 251 of the first transistor 25 and electrically connected to the PWM signal terminal, and the drive module 11 may be controlled so as to control a light emission state of the light-emitting module 13. The first transistor 25 may be disposed on a side of the substrate 27 so as to achieve active matrix (AM). In this case, the first transistor 25 may be a thin film transistor (TFT) so that the first substrate 25 may be prepared directly on the substrate 27. The cost of the solution is low, and in the case where the light-emitting panel is used as the backlight module, a large number of sub-regions may be controlled, which is conducive to improving image display quality.

In other embodiments, as shown in FIGS. 25 and 26, the drive module 11 may also be integrated into the driver chip 28 so as to achieve passive matrix (PM). In this case, the light-emitting module 13 may be directly driven by the driver chip 28, the process is simple, and power consumption is relatively low.

As shown in FIG. 26, the driver chip 28 may be directly disposed on the substrate 27, but is not limited to this.

Figure 27:
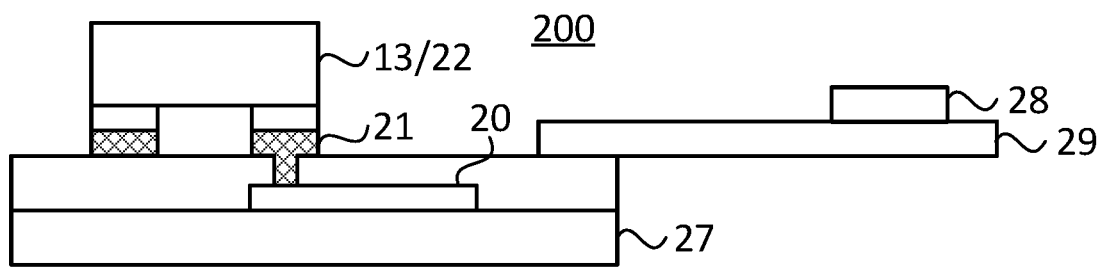
FIG. 27 is a partial sectional diagram of another light-emitting panel according to an embodiment of the present disclosure.

FIG. 27 is a partial sectional diagram of another light-emitting panel according to an embodiment of the present disclosure. As shown in FIG. 27, the driver chip 28 may also be disposed on a flexible circuit board 29. In this manner, the flexible circuit board 29 and the light-emitting panel 200 are bound so that the driver chip 28 is connected to the light-emitting panel 200. In this solution, the driver chip 28 may be bent to the back of the light-emitting panel 200 through the flexible circuit board 29, which is conducive to reducing a width of the frame.

Figure 28:
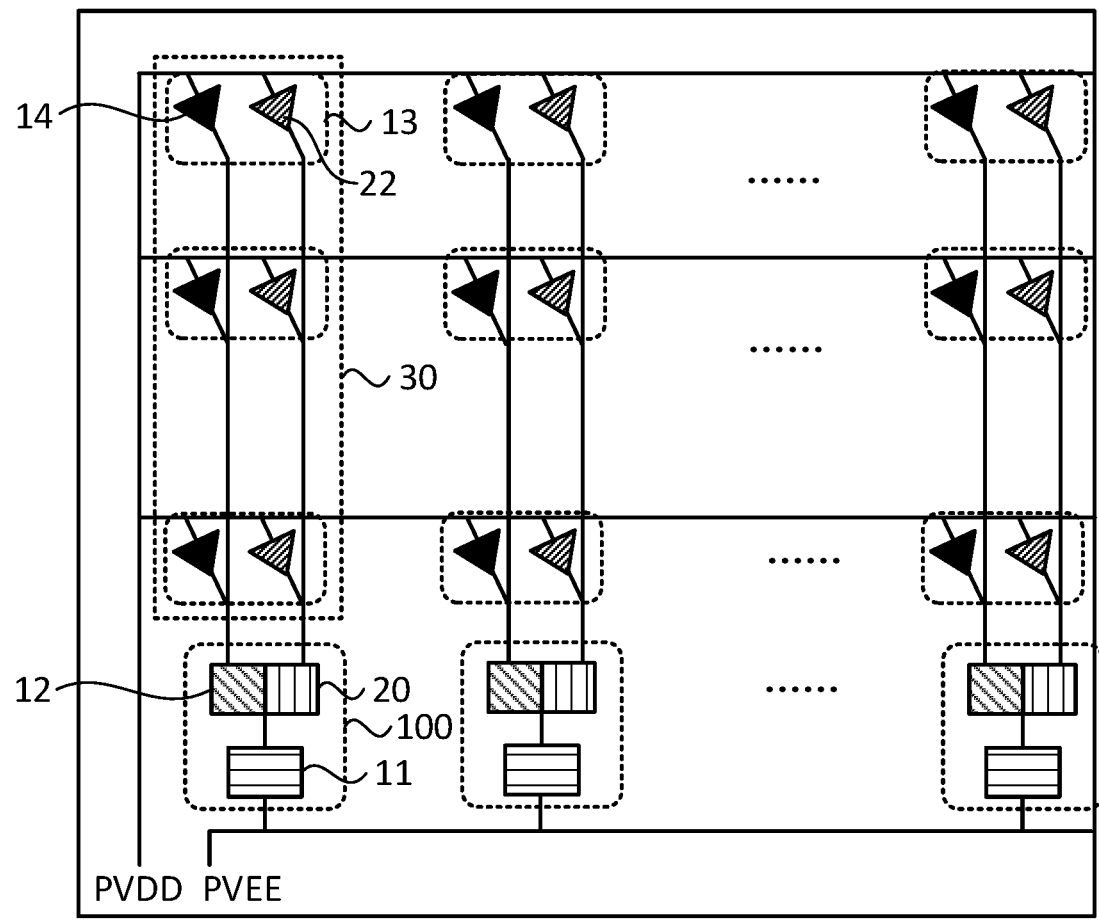
FIG. 28 is a structural diagram of a light-emitting panel according to an embodiment of the present disclosure.

FIG. 28 is a structural diagram of a light-emitting panel according to an embodiment of the present disclosure. As shown in FIG. 28, the light-emitting panel 200 includes multiple light-emitting sub-regions 30, and one light-emitting sub-region 30 includes at least one light-emitting module 13 and one driver circuit 100.

By way of example, as shown in FIG. 28, in the case where the light-emitting panel 200 is used as the backlight module, the light-emitting panel 200 may include multiple light-emitting sub-regions 30 arranged in an array. The number of the light-emitting sub-regions 30 may be set according to actual requirements, which is not limited in the embodiments of the present disclosure.

Each light-emitting sub-region 30 includes at least one light-emitting module 13 and one driver circuit 100. The driver circuit 100 precisely controls the backlight brightness of the sub-region where the driver circuit 100 is located, so as to achieve higher image brightness contrast, which is conducive to improving the image display quality. As shown in FIG. 28, the case where the driver circuit 100 includes the short-circuit protection module 12 and the backup circuit switching module 20 is used as an example. If the original light-emitting unit 14 in a certain light-emitting sub-region 30 is short-circuited, the short-circuit protection module 12 in the light-emitting sub-region 30 is disconnected so as to cut off the current path between the original light-emitting unit 14 and the second power supply terminal PVEE in the light-emitting sub-region 30, thereby playing a role of short-circuit protection. At the same time, the backup circuit switching module 20 in the light-emitting sub-region 30 is turned on so that the backup light-emitting unit 22 in the light-emitting sub-region 30 is turned on and replaces the short-circuited original light-emitting unit 14 to emit light, thereby ensuring the normal display.

In an embodiment, the light-emitting module 13 includes at least one light-emitting diode.

In an embodiment, the light-emitting module 13 may be a light-emitting diode (LED), a micro light-emitting diode (Micro-LED), or a Mini-LED, but is not limited to this. The light-emitting diode, as a current-type light-emitting device, has active lighting, fast response speed, a wide viewing angle, rich colors, high brightness, low power consumption and many other advantages.

The Micro-LED refers to an LED chip with a grain size of less than 100 microns and can achieve a display with pixel particles of a size of 0.05 mm or less, and the Micro-LED consumes very little power and has better material stability and no image retention. Mini-LED refers to an LED chip with a grain size of about 100 microns to 1000 microns. In the case where the Mini-LED is adopted, the yield is high, the Mini-LED has characteristics of special-shaped cutting, a highly curved backlight form may be formed in conjunction with a flexible substrate, and the Mini-LED has better color rendering.

In an embodiment, the light-emitting module 13 may be a single light-emitting diode or multiple interconnected light-emitting diodes, which may be set by those skilled in the art according to actual requirements.

Figure 29:
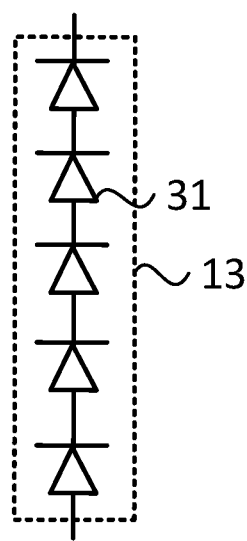
FIG. 29 is a structural diagram of a light-emitting module according to an embodiment of the present disclosure.

FIG. 29 is a structural diagram of a light-emitting module according to an embodiment of the present disclosure. As shown in FIG. 29, by way of example, the light-emitting module 13 may include multiple light-emitting diodes 31 connected in series.

Figure 30:
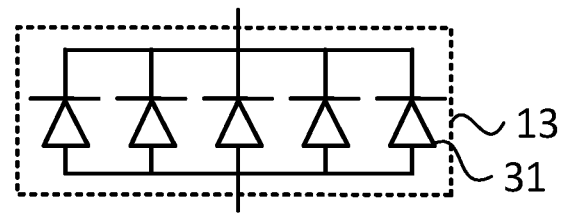
FIG. 30 is a structural diagram of another light-emitting module according to an embodiment of the present disclosure.

FIG. 30 is a structural diagram of another light-emitting module according to an embodiment of the present disclosure. As shown in FIG. 30, by way of example, the light-emitting module 13 may include multiple light-emitting diodes 31 connected in parallel.

Figure 31:
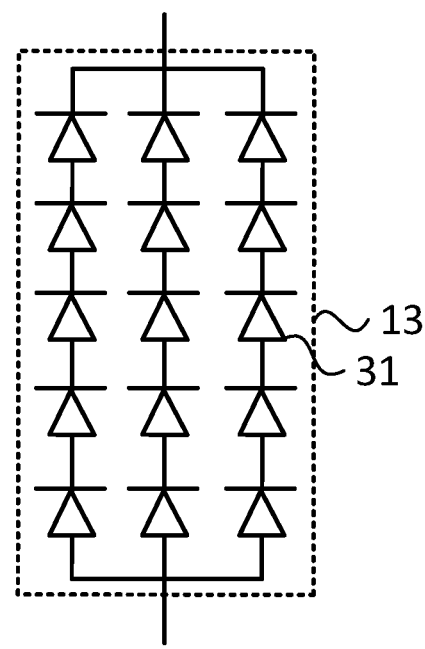
FIG. 31 is a structural diagram of another light-emitting module according to an embodiment of the present disclosure.

FIG. 31 is a structural diagram of another light-emitting module according to an embodiment of the present disclosure. As shown in FIG. 31, by way of example, the light-emitting module 13 may include multiple light-emitting diodes 31 connected in series and parallel.

Based on the same inventive concept, an embodiment of the present disclosure further provides a display device. The display device provided in the embodiment of the present disclosure includes the light-emitting panel provided in any of the preceding embodiments. Therefore, the light-emitting panel provided in the embodiment of the present disclosure has the technical effects of the technical solutions in any of the preceding embodiments and explanations of structures and terms the same as or corresponding to structures and terms in the preceding embodiments are not repeated here.

Figure 32:
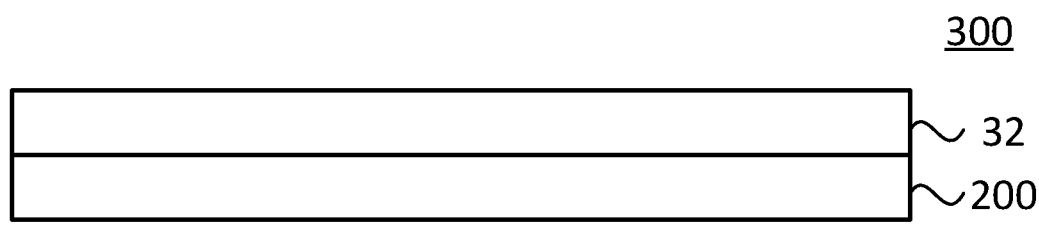
FIG. 32 is a structural diagram of a display device according to an embodiment of the present disclosure.

By way of example, FIG. 32 is a structural diagram of a display device according to an embodiment of the present disclosure. As shown in FIG. 32, a display device 300 not only includes the light-emitting panel 200 as the backlight module, but also includes a display panel 32, where the display panel 32 is disposed on a light-exiting side of the light-emitting panel 200. The display panel 32 may modulate light emitted from the light-emitting panel 200 so as to present an image to be displayed. The display panel 32 may be a liquid crystal display panel or other types of passive light-emitting display panels known to those skilled in the art, which is not limited in the embodiments of the present disclosure.

FIG. 33 is a structural diagram of another display device according to an embodiment of the present disclosure. As shown in FIG. 33, by way of example, the light-emitting panel 200 may also be directly used for display in the display device, which is not limited in the embodiments of the present disclosure.

Based on the same inventive concept, an embodiment of the present disclosure further provides a preparation method of a light-emitting panel, which is used for preparing any light-emitting panel provided in the preceding embodiments. Explanations of structures and terms the same as or corresponding to structures and terms in the preceding embodiments are not be repeated here. FIG. 34 is a flowchart of a preparation method of a light-emitting panel according to an embodiment of the present disclosure. As shown in FIG. 34, the method includes steps described below.

In S110, a driver circuit is prepared on a substrate, where the driver circuit includes a terminal connection module, a drive module, and a short-circuit protection module, where the terminal connection module, the drive module, and the short-circuit protection module are connected in series between a first power supply terminal and a second power supply terminal, and the short-circuit protection module is connected in series between the terminal connection module and the second power supply terminal.

The substrate may be a glass substrate or other types of substrates, which is not limited in the embodiments of the present disclosure.

In S120, a light-emitting module is provided, where the light-emitting module includes an original light-emitting unit.

The light-emitting module may be grown and prepared on a growth substrate, and then the light-emitting module is transferred to the substrate prepared with the driver circuit, so as to achieve connection between the light-emitting module and the driver circuit.

Through the transfer method, a large number of light-emitting modules are transferred to the substrate at one time at the same time, thereby saving time.

In S130, the original light-emitting unit is connected to the terminal connection module so that the original light-emitting unit is connected in series between the first power supply terminal and the second power supply terminal, where the short-circuit protection module is configured to be disconnected in a case where the original light-emitting unit is short-circuited.

In an embodiment, the original light-emitting unit may be connected to the terminal connection module by means of binding, where the binding may also be called as stamping or welding, and tin brushing, die attach, reflowing, cleaning, sealing and baking may be performed on a surface of a binding layer of the terminal connection module. In this manner, while good electrical connection is ensured, the bonding reliability may be improved, which is conducive to ensuring that the light-emitting panel has a relatively stable structure and prolonging the service life of the light-emitting panel.

In the preparation method of a light-emitting panel provided in the embodiment of the present disclosure, the driver circuit is prepared on the substrate, where the driver circuit includes the terminal connection module, the drive module, and the short-circuit protection module, where the terminal connection module, the drive module, and the short-circuit protection module are connected in series between the first power supply terminal and the second power supply terminal, and the short-circuit protection module is connected in series between the terminal connection module and the second power supply terminal; the original light-emitting unit is connected to the terminal connection module so that the short-circuit protection module is connected in series between the original light-emitting unit and the second power supply terminal, and in the case where the original light-emitting unit is short-circuited, the short-circuit protection module is disconnected, so as to cut off the current path between the original light-emitting unit and the second power supply terminal. In this manner, damage to the elements in the driver circuit caused by a continuous large current after the original light-emitting unit is short-circuited and poor display caused by the damage are avoided.

In an embodiment, in the case where the driver circuit is prepared on the substrate, the preparation method further includes a step described below.

A backup circuit switching module and a backup terminal connection module are prepared on the substrate, where the backup terminal connection module, the drive module, and the backup circuit switching module are connected in series between the first power supply terminal and the second power supply terminal.

The backup circuit switching module is configured to be turned on in a case where the original light-emitting unit is short-circuited.

In this embodiment, the backup circuit switching module is prepared on the substrate. In this manner, in the case where the original light-emitting unit is short-circuited, the backup circuit switching module is turned on so that the backup light-emitting unit is turned on while the short-circuit protection module cuts off the current path between the original light-emitting unit and the second power supply terminal, and the backup light-emitting unit replaces the short-circuited original light-emitting unit to emit light, thereby ensuring the normal display.

The backup circuit switching module and the short-circuit protection module may be prepared in a same process, thereby reducing preparation difficulty and shortening the process time.

In an embodiment, after the backup circuit switching module and the backup terminal connection module are prepared on the substrate, the preparation method further includes steps described below.

The light-emitting module is provided, where the light-emitting module includes a backup light-emitting unit.

The backup light-emitting unit is connected to the backup terminal connection module so that the backup light-emitting unit is connected in series between the first power supply terminal and the second power supply terminal.

Figure 35:
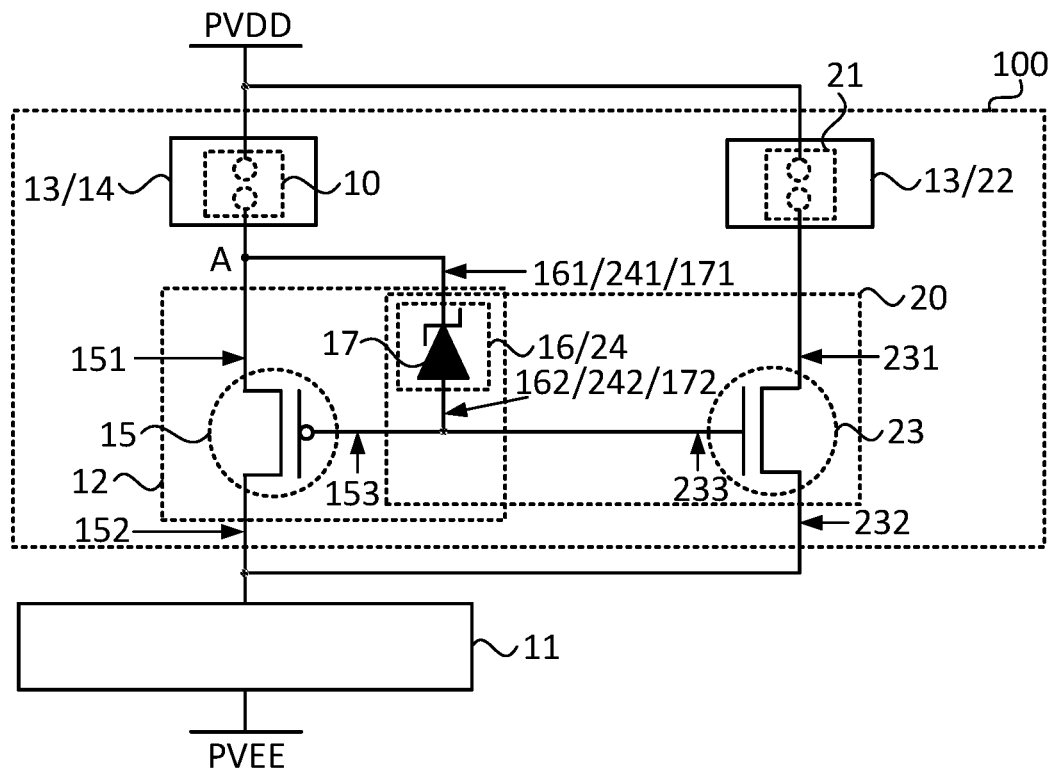
FIG. 35 is a structural diagram of a preparation method of a light-emitting panel according to an embodiment of the present disclosure.

FIG. 35 is a structural diagram of a preparation method of a light-emitting panel according to an embodiment of the present disclosure. As shown in FIG. 35, by way of example, while the original light-emitting unit 14 is connected to the terminal connection module 10, the backup light-emitting unit 22 may be connected to the backup terminal connection module 21. In the case where the original light-emitting unit 14 is not short-circuited, the backup circuit switching module 20 is disconnected, thereby ensuring that the backup light-emitting unit 22 does not emit light and interfere with the normal display. In the case where the original light-emitting unit 14 is short-circuited, the backup circuit switching module 20 is turned on so that while the short-circuit protection module 12 cuts off the current path between the original light-emitting unit 14 and the second power supply terminal PVEE, the backup light-emitting unit 22 is turned on, and the backup light-emitting unit 22 replaces the short-circuited original light-emitting unit 14 to emit light, thereby ensuring the normal display.

When the original light-emitting unit 14 is stamped, the backup light-emitting unit 22 is also stamped, and when the original light-emitting unit 14 is short-circuited, the backup light-emitting unit 22 may be automatically turned on so as to replace the short-circuited original light-emitting unit 14 to emit light. In this method, only one time of stamping is needed, thereby reducing preparation difficulty and shortening the process time.

In an embodiment, after the backup circuit switching module and the backup terminal connection module are prepared on the substrate, the preparation method further includes steps described below.

In the case where the original light-emitting unit is short-circuited, the light-emitting module is provided, where the light-emitting module includes a backup light-emitting unit.

The backup light-emitting unit is connected to the backup terminal connection module so that the backup light-emitting unit is connected in series between the first power supply terminal and the second power supply terminal.

Figure 36:
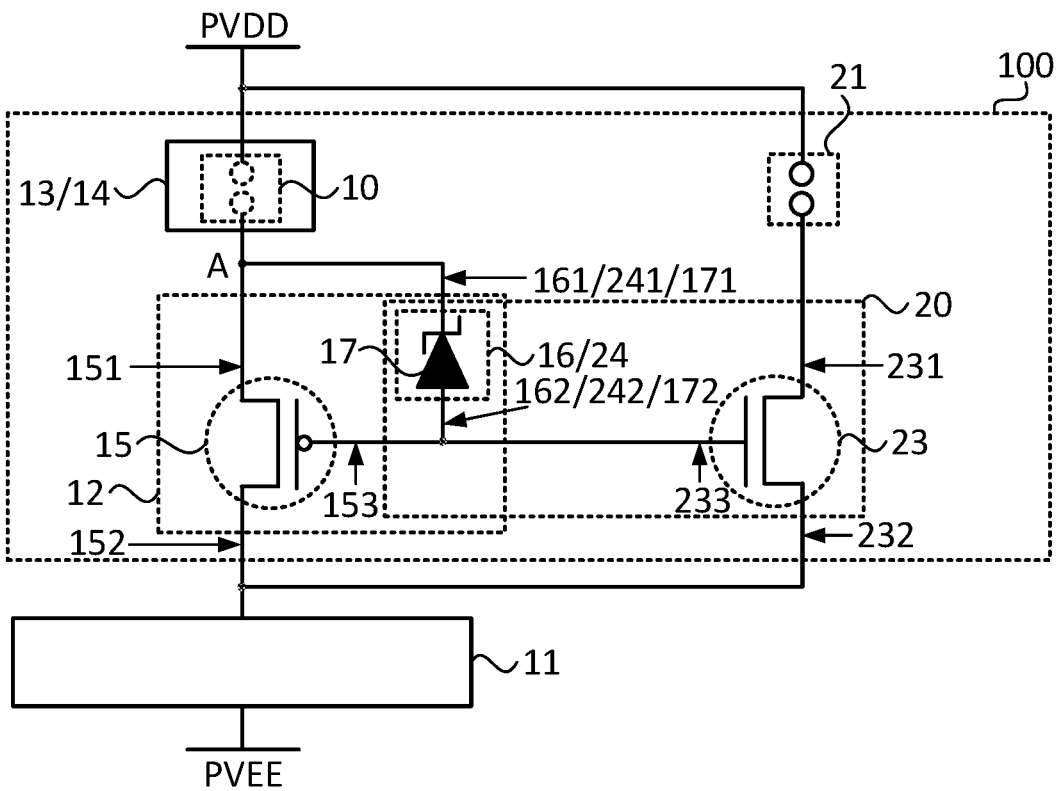
FIG. 36 is a structural diagram of another preparation method of a light-emitting panel according to an embodiment of the present disclosure.

FIG. 36 is a structural diagram of another preparation method of a light-emitting panel according to an embodiment of the present disclosure. As shown in FIG. 36, by way of example, in the case where the original light-emitting unit 14 is connected to the terminal connection module 10, the backup light-emitting unit 22 is not connected to the backup terminal connection module 21, that is, the backup light-emitting unit 22 is not stamped. In this case, only the backup terminal connection module 21 for connecting the backup light-emitting unit 22 is reserved on the light-emitting panel. In the case where the original light-emitting unit 14 is not short-circuited, the short-circuit protection module 12 is in an on state and the original light-emitting unit 14 displays normally. In the case where the original light-emitting unit 14 in a certain light-emitting sub-region is short-circuited, the short-circuit protection module 12 in the light-emitting sub-region is disconnected, so as to cut off the current path between the original light-emitting unit 14 in the light-emitting sub-region and the second power supply terminal PVEE, thereby playing a role of short-circuit protection. In this case, the original light-emitting unit 14 in the light-emitting sub-region does not emit light, resulting in the appearance of a dark region, and the human eye may easily find the light-emitting sub-region.

In this case, the backup light-emitting unit 22 may be stamped in the light-emitting sub-region where the original light-emitting unit 14 is short-circuited. Since the backup circuit switching module 20 in the light-emitting sub-region is turned on, the backup light-emitting unit 22 in the light-emitting sub-region may be turned on so that the backup light-emitting unit 22 replaces the short-circuited original light-emitting unit 14 to emit light, thereby ensuring the normal display.

In the case where the original light-emitting unit 14 is short-circuited, the backup light-emitting unit 22 is then stamped so that the backup light-emitting unit 22 in the light-emitting panel where the original light-emitting unit 14 is not shorted-circuited does not need to be stamped, and in the light-emitting panel where the original light-emitting unit 14 is short-circuited, only the backup light-emitting unit 22 in the light-emitting sub-region where short-circuit occurs needs to be stamped, thereby reducing the use of the backup light-emitting unit 22 and the cost.

It is to be understood that various forms of processes shown above may be adopted with steps reordered, added or deleted. For example, the steps described in the present disclosure may be performed in parallel, sequentially or in different orders, as long as the desired results of the technical solutions of the present disclosure can be achieved, and no limitation is imposed herein.

The above-mentioned specific embodiments do not constitute a limitation on the protection scope of the present disclosure. It is to be understood by those skilled in the art that various modifications, combinations, sub-combinations and substitutions may be performed according to design requirements and other factors. Any modifications, equivalent replacements, improvements and the like within the spirit and principle of the present disclosure shall fall within the protection scope of the present disclosure.

What is claimed is:

1. A driver circuit, configured to drive a light-emitting module to emit light;
   wherein the driver circuit comprises a terminal connection module, a drive module, and a short-circuit protection module, wherein the terminal connection module, the drive module, and the short-circuit protection module are connected in series between a first power supply terminal and a second power supply terminal, and the short-circuit protection module is connected in series between the terminal connection module and the second power supply terminal;
   wherein the light-emitting module comprises an original light-emitting unit, and the terminal connection module is connected to the original light-emitting unit so that the original light-emitting unit is connected in series between the first power supply terminal and the second power supply terminal; and
   the short-circuit protection module is configured to be disconnected in a case where the original light-emitting unit is short-circuited.

2. The driver circuit of claim 1, wherein
   the short-circuit protection module comprises a first P-type transistor and a first switching unit;
   a power supply input terminal of the original light-emitting unit is connected to the first power supply terminal;
   a source of the first P-type transistor, a first terminal of the first switching unit, and a power supply output terminal of the original light-emitting unit are connected to a first node;
   a drain of the first P-type transistor is connected to the second power supply terminal, and a gate of the first P-type transistor is connected to a second terminal of the first switching unit; and
   in a case where a voltage at the first node is greater than a first threshold voltage, the first switching unit is turned on, and the first P-type transistor is turned off so that the short-circuit protection module is disconnected.

3. The driver circuit of claim 2, wherein
   the first switching unit comprises a zener diode, wherein a cathode of the zener diode is used as the first terminal of the first switching unit, and an anode of the zener diode is used as the second terminal of the first switching unit;
   the first switching unit comprises a first N-type transistor, wherein a drain of the first N-type transistor is used as the first terminal of the first switching unit, a source of the first N-type transistor is used as the second terminal of the first switching unit, and a gate of the first N-type transistor is connected to the source of the first N-type transistor; or
   the first switching unit comprises a second P-type transistor, wherein a source of the second P-type transistor is used as the first terminal of the first switching unit, a drain of the second P-type transistor is used as the second terminal of the first switching unit, and a gate of the second P-type transistor is connected to the source of the second P-type transistor.

4. The driver circuit of claim 2, wherein
   the first threshold voltage is less than a voltage at the first power supply terminal; and
   in a case where the original light-emitting unit is not short-circuited, the voltage at the first node is less than the first threshold voltage.

5. The driver circuit of claim 2, wherein
   the driver circuit further comprises a pull-down resistor, wherein an end of the pull-down resistor is connected to the gate of the first P-type transistor, and another end of the pull-down resistor is grounded.

6. The driver circuit of claim 1, further comprising:
   a backup circuit switching module and a backup terminal connection module;
   wherein the backup terminal connection module, the drive module, and the backup circuit switching module are connected in series between the first power supply terminal and the second power supply terminal;
   wherein the light-emitting module further comprises a backup light-emitting unit, and the backup terminal connection module is connected to the backup light-emitting unit so that the backup light-emitting unit is connected in series between the first power supply terminal and the second power supply terminal;
   wherein the backup circuit switching module is configured to be turned on in a case where the original light-emitting unit is short-circuited.

7. The driver circuit of claim 6, wherein
   the backup circuit switching module comprises a second N-type transistor and a second switching unit;
   wherein a first terminal of the second switching unit and a power supply output terminal of the original light-emitting unit are connected to a first node;
   a drain of the second N-type transistor is connected to the backup terminal connection module, a source of the second N-type transistor is connected to the second power supply terminal, and a gate of the second N-type transistor is connected to a second terminal of the second switching unit; and
   in a case where a voltage at the first node is greater than a first threshold voltage, the second switching unit is turned on, and the second N-type transistor is turned on so that the backup circuit switching module is turned on.

8. The driver circuit of claim 7, wherein
the short-circuit protection module comprises a first P-type transistor and a first switching unit;
a power supply input terminal of the original light-emitting unit is connected to the first power supply terminal;
a source of the first P-type transistor, a first terminal of the first switching unit, and the power supply output terminal of the original light-emitting unit are connected to the first node;
a drain of the first P-type transistor is connected to the second power supply terminal, and a gate of the first P-type transistor is connected to a second terminal of the first switching unit; and
the second switching unit and the first switching unit are a same switching unit,
wherein the driver circuit further comprises a pull-down resistor, wherein an end of the pull-down resistor is connected to the gate of the first P-type transistor, and another end of the pull-down resistor is grounded.

9. The driver circuit of claim 7, wherein
a threshold voltage of the second N-type transistor is less than a voltage at the first power supply terminal.

10. The driver circuit of claim 1, comprising:
a first transistor, wherein a control terminal of the first transistor is connected to a pulse width modulation (PWM) signal terminal; and
a first terminal of the first transistor is electrically connected to the short-circuit protection module, and a second terminal of the first transistor is connected to the second power supply terminal; or a first terminal of the first transistor is connected to the first power supply terminal, and a second terminal of the first transistor is connected to the terminal connection module.

11. A light-emitting panel, comprising a light-emitting module and a driver circuit, wherein the driver circuit is configured to drive a light-emitting module to emit light;
wherein the driver circuit comprises a terminal connection module, a drive module, and a short-circuit protection module, wherein the terminal connection module, the drive module, and the short-circuit protection module are connected in series between a first power supply terminal and a second power supply terminal, and the short-circuit protection module is connected in series between the terminal connection module and the second power supply terminal;
wherein the light-emitting module comprises an original light-emitting unit, and the terminal connection module is connected to the original light-emitting unit so that the original light-emitting unit is connected in series between the first power supply terminal and the second power supply terminal; and
the short-circuit protection module is configured to be disconnected in a case where the original light-emitting unit is short-circuited.

12. The light-emitting panel of claim 11, wherein
the light-emitting panel comprises a substrate, and the light-emitting module is disposed on a side of the substrate;
a terminal connection module is located on a side of the substrate facing towards the light-emitting module; and
a short-circuit protection module is located on the side of the substrate facing towards the light-emitting module, or the short-circuit protection module is located on a side of the substrate facing away from the light-emitting module.

13. The light-emitting panel of claim 11, wherein
the driver circuit further comprises a backup circuit switching module and a backup terminal connection module;
wherein the backup terminal connection module, a drive module, and the backup circuit switching module are connected in series between a first power supply terminal and a second power supply terminal;
wherein the light-emitting module comprises a backup light-emitting unit, and the backup terminal connection module is connected to the backup light-emitting unit so that the backup light-emitting unit is connected in series between the first power supply terminal and the second power supply terminal;
wherein the backup circuit switching module is configured to be turned on in a case where an original light-emitting unit is short-circuited;
the light-emitting panel comprises a substrate, and the light-emitting module is disposed on a side of the substrate;
the backup terminal connection module is located on a side of the substrate facing towards the light-emitting module; and
the backup circuit switching module is located on the side of the substrate facing towards the light-emitting module, or the backup circuit switching module is located on a side of the substrate facing away from the light-emitting module.

14. The light-emitting panel of claim 11, comprising:
a substrate;
wherein a drive module comprises a first transistor, wherein a control terminal of the first transistor is connected to a pulse width modulation (PWM) signal terminal; and the first transistor is located on a side of the substrate; or
the light-emitting panel further comprises a driver chip, and the drive module is integrated in the driver chip.

15. The light-emitting panel of claim 11, wherein
the light-emitting panel comprises a plurality of light-emitting sub-regions, and a light-emitting sub-region of the plurality of light-emitting sub-regions comprises at least one light-emitting module and one driver circuit,
wherein the light-emitting module comprises at least one light-emitting diode.

16. A display device, comprising the light-emitting panel claim 11.

17. A preparation method of a light-emitting panel, comprising:
preparing a driver circuit on a substrate, wherein the driver circuit comprises a terminal connection module, a drive module, and a short-circuit protection module, wherein the terminal connection module, the drive module, and the short-circuit protection module are connected in series between a first power supply terminal and a second power supply terminal, and the short-circuit protection module is connected in series between the terminal connection module and the second power supply terminal;
providing a light-emitting module, wherein the light-emitting module comprises an original light-emitting unit; and
connecting the original light-emitting unit to the terminal connection module so that the original light-emitting unit is connected in series between the first power supply terminal and the second power supply terminal;

wherein the short-circuit protection module is configured to be disconnected in a case where the original light-emitting unit is short-circuited.

18. The preparation method of claim 17, wherein in a case where the driver circuit is prepared on the substrate, the preparation method further comprises:

preparing a backup circuit switching module and a backup terminal connection module on the substrate, wherein the backup terminal connection module, the drive module, and the backup circuit switching module are connected in series between the first power supply terminal and the second power supply terminal;

wherein the backup circuit switching module is configured is turned on in a case where the original light-emitting unit is short-circuited.

19. The preparation method of claim 18, wherein after the backup circuit switching module and the backup terminal connection module are prepared on the substrate, the preparation method further comprises:

providing the light-emitting module, wherein the light-emitting module comprises a backup light-emitting unit; and connecting the backup light-emitting unit to the backup terminal connection module so that the backup light-emitting unit is connected in series between the first power supply terminal and the second power supply terminal.

20. The preparation method of claim 18, wherein after the backup circuit switching module and the backup terminal connection module are prepared on the substrate, the preparation method further comprises:

in a case where the original light-emitting unit is short-circuited, providing the light-emitting module, wherein the light-emitting module comprises a backup light-emitting unit; and connecting the backup light-emitting unit to the backup terminal connection module so that the backup light-emitting unit is connected in series between the first power supply terminal and the second power supply terminal.

* * * * *